United States Patent
Northcutt et al.

(10) Patent No.: US 9,201,778 B2
(45) Date of Patent: Dec. 1, 2015

(54) SMART SCALABLE STORAGE SWITCH ARCHITECTURE

(71) Applicant: Lattice Semiconductor Corporation, Portland, OR (US)

(72) Inventors: J. D. Northcutt, Menlo Park, CA (US); James G. Hanko, Redwood City, CA (US); Brian K. Schmidt, Mountain View, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 14/067,363

(22) Filed: Oct. 30, 2013

(65) Prior Publication Data

US 2014/0059295 A1    Feb. 27, 2014

Related U.S. Application Data

(63) Continuation of application No. 11/510,254, filed on Aug. 24, 2006, now Pat. No. 8,595,434.

(60) Provisional application No. 60/711,863, filed on Aug. 25, 2005.

(51) Int. Cl.
*G06F 12/08* (2006.01)
*G06F 12/00* (2006.01)
(Continued)

(52) U.S. Cl.
CPC .............. *G06F 12/00* (2013.01); *G06F 3/0605* (2013.01); *G06F 3/067* (2013.01); *G06F 3/0626* (2013.01); *G06F 3/0635* (2013.01); *G06F 3/0664* (2013.01); *G06F 3/0689* (2013.01);

(Continued)

(58) Field of Classification Search
None
See application file for complete search history.

(56) References Cited

U.S. PATENT DOCUMENTS 5,274,645 A    12/1993    Idleman et al.
5,313,617 A    5/1994    Nakano et al.
(Continued)

FOREIGN PATENT DOCUMENTS

EP    0428021    5/1991
EP    1811396    7/2007
(Continued)

OTHER PUBLICATIONS

Notification of Reasons for Refusal for Japanese Patent Application No. 2008-528024, Mailed Aug. 8, 2011, 2 pages.
(Continued)

*Primary Examiner* — Kaushikkumar Patel
(74) *Attorney, Agent, or Firm* — Fenwick & West LLP

(57) ABSTRACT

A method and system for providing advanced storage features using commodity, consumer-level storage devices is provided. The advanced storage system is a component that is connected between the computer system and one or more physical disk drives. The host interface of the advanced storage system presents itself to the computer system as a virtual disk drive that implements the commands of consumer-level storage hardware that are familiar to the host controller of the computer system. Similarly, the storage device interface of the advanced storage system presents itself to one or more disk drives as a consumer-level host controller, regardless of the actual topology of the physical storage devices that are connected. This system provides a simple way for a user to combine low-cost, consumer-level hardware to add advanced storage features to a computer system.

19 Claims, 12 Drawing Sheets

(51) Int. Cl.
*G06F 3/06* (2006.01)
*G06F 12/10* (2006.01)
*H04L 12/931* (2013.01)

(52) U.S. Cl.
CPC .......... *G06F 12/10* (2013.01); *G06F 2212/262* (2013.01); *H04L 49/35* (2013.01)

(56) References Cited

U.S. PATENT DOCUMENTS

| | | | |
|---|---|---|---|
| 5,502,836 A * | 3/1996 | Hale et al. ................ | 711/170 |
| 5,822,782 A * | 10/1998 | Humlicek et al. .......... | 711/170 |
| 6,098,119 A * | 8/2000 | Surugucchi et al. ........ | 710/10 |
| 6,311,257 B1 * | 10/2001 | Fitzgerald et al. .......... | 711/170 |
| 6,735,650 B1 | 5/2004 | Rothberg | |
| 6,895,455 B1 | 5/2005 | Rothberg | |
| 7,167,929 B2 | 1/2007 | Steinmetz et al. | |
| 7,200,698 B1 | 4/2007 | Rothberg | |
| 2003/0079018 A1 | 4/2003 | Lolayekar et al. | |
| 2004/0073747 A1 * | 4/2004 | Lu .................. | 711/114 |
| 2004/0098645 A1 | 5/2004 | Beckett et al. | |
| 2004/0177218 A1 | 9/2004 | Meehan et al. | |
| 2004/0225775 A1 | 11/2004 | Pellegrino et al. | |
| 2005/0005044 A1 * | 1/2005 | Liu et al. ................ | 710/74 |
| 2005/0102469 A1 * | 5/2005 | Zohar et al. ............. | 711/114 |
| 2005/0102582 A1 * | 5/2005 | Fuente et al. ............ | 714/42 |
| 2005/0114464 A1 * | 5/2005 | Amir et al. ............. | 709/213 |
| 2005/0278501 A1 * | 12/2005 | Taguchi ............... | 711/203 |
| 2006/0020752 A1 * | 1/2006 | Schnapp et al. ........ | 711/113 |
| 2006/0064560 A1 | 3/2006 | Mizuno et al. | |
| 2006/0101203 A1 | 5/2006 | Yanagisawa | |
| 2006/0200470 A1 * | 9/2006 | Lacapra et al. ......... | 707/10 |
| 2006/0230218 A1 | 10/2006 | Warren et al. | |
| 2006/0242312 A1 | 10/2006 | Crespi et al. | |
| 2007/0050538 A1 | 3/2007 | Northcutt et al. | |

FOREIGN PATENT DOCUMENTS

| | | |
|---|---|---|
| JP | 2000020245 | 1/2000 |
| JP | 2007179549 | 7/2007 |
| TW | 464822 | 11/2011 |
| WO | WO-2005/055043 | 6/2005 |

OTHER PUBLICATIONS

Third Office Action for Chinese Patent Application No. 20068003571.3 Mailed Nov. 16, 2011.
Decision on Rejection for Chinese Patent Application No. 200680030571.3. Mailed Jun. 21, 2012.
Office Action for Japanese Patent Application 2008-528024 Mailed Jun. 19, 2012.
First Office Action for Chinese Patent Application No. 200680030571.3 mailed Mar. 25 2010.
Second Office Action for Chinese Patent Application No. 200680030571.3 mailed Oct. 27 2010.
Taiwanese Office Action mailed Mar. 12, 2010 for TW Application No. 095131162.
"European Search Report , EP06801919, PCT/US2006032454", Mailed Jul. 1, 2010, pp. 1-8.
Dell Computer Corporation, et al., *Dell Computer Corporation et al.*; Revision 1.2 Jan. 27, 2005; XP008071157, pp. ii, 4, 21, 68.
Non-Final Office Action for TW Patent application No. 095131162 mailed by TW Assoc on Nov. 29, 2009—recommendations in English available—TW Office action not available.
"Serial ATM: Extensions to Serial ATA 1.0a", *Dell Computer Corp et al.*: Revision 1.2; Aug. 27, 2004.
Unknown, "Unknown", web site—http://qa.pcuser.com.tw/modules/news/_; cited page of the forum in the web site—http://qa.pcuser.com.tw/modules/newbb/viewtopic.php?viewmode=flat&order=DESC&topic_id=22555&forum=19_; date accessed by TW Examiner is Oct. 1, 2009; date of public, English translation received from TW Assoc on Dec. 4, 2009—both TW and English version are uploaded.
USPTO, "NALL Mailed Feb. 27, 2009 for U.S. Appl. No. 11/314,162", (Feb. 27, 2009), Whole Document.
"OA Mailed Apr. 17, 2008 for U.S. Appl. No. 11/314,162", (Apr. 17, 2008), Whole Document.
"ISR WO Mailed Sep. 28, 2007 for PCT/US06/32454", (Sep. 28, 2007), Whole Document.
European Examination Report, European Application No. 06801919.9, Mar. 16, 2015, 8 pages.
United States Office Action, U.S. Appl. No. 11/510,254, Oct. 18, 2012, 16 pages.
United States Office Action, U.S. Appl. No. 11/510,254, May 8, 2012, 23 pages.
United States Office Action, U.S. Appl. No. 11/510,254, Sep. 22, 2009, 16 pages.
United States Office Action, U.S. Appl. No. 11/510,254, Apr. 24, 2009, 21 pages.
United States Office Action, U.S. Appl. No. 11/510,254, Nov. 20, 2008, 17 pages.
United States Office Action, U.S. Appl. No. 11/510,254, Apr. 30, 2008, 14 pages.
United States Office Action, U.S. Appl. No. 11/510,254, Aug. 17, 2007, 14 pages.

* cited by examiner

SMART SCALABLE STORAGE SWITCH ARCHITECTURE

CROSS-REFERENCE TO RELATED APPLICATIONS

This application is a continuation of U.S. patent application Ser. No. 11/510,254, entitled "Smart Scalable Storage Switch Architecture" by J. D. Northcutt, et al., filed Aug. 24, 2006, now allowed, which claims the benefit of and priority to U.S. Provisional Patent Application No. 60/711,863, entitled "Smart Scalable Storage Switch Architecture" by J. D. Northcutt, et al., filed Aug. 25, 2005, the entire contents of which are incorporated herein by reference and the benefit and priority are claimed thereof.

BACKGROUND

Storage systems often use multiple disk drives to provide features such as fault tolerance, increased throughput, increased storage capacity, and expandability. For example, mirroring uses two or more drives to store duplicate copies of data such that if one of the drives fails the data can still be read from another drive. Striping allows data to be divided into portions that are written (and read) in parallel to two or more drives at the same time to provide increased throughput. Concatenation combines two or more drives to enable a higher storage capacity than would be available from a single disk drive. While such features have become common in enterprise-class storage solutions, these features are still rare among consumer systems. The cost and complexity of assembling such systems prevents many consumers from being able to take advantage of these advanced storage features.

Design limitations of commodity, consumer-level storage hardware also prevent users from benefiting from these advanced storage features. For example, many computer systems limit the number of disk drives that can be addressed by a single host interface. The Serial Advanced Technology Attachment (SATA) 1.0 specification (available on the web at www.serialata.org) only supports connecting a single disk drive to a host. The later SATA II Port Multiplier specification (available on the web at www.serialata.org) added an additional addressing scheme that allows a host to address 15 physical disk drives, but not all hosts support the newer specification, and having the host computer system manage multiple drives involves additional complexity and configuration that is difficult for many consumers. The net result is that the consumer is not able to obtain easy-to-use, low-cost hardware capable of providing high-end storage features available to enterprise-class computer systems.

SUMMARY

A method and system for providing advanced storage features using commodity, consumer-level storage devices is provided. The advanced storage system is a component that is connected between the computer system and one or more physical disk drives. The host interface of the advanced storage system presents itself to the computer system as one or more virtual disk drives that implement the commands of consumer-level storage hardware that are familiar to the host controller of the computer system. Similarly, the storage device interface of the advanced storage system presents itself to one or more physical disk drives as a consumer-level host controller, regardless of the actual topology of the physical storage devices that are connected. First, the advanced storage system receives a command from the computer system to the virtual drive, and maps the command to one or more physical commands. Next, the mapped physical commands are sent to the physical disk drives to perform the substance of the command. Finally, replies from the physical disk drives are combined and a single reply to the virtual command is sent back to the computer system. This system provides a simple way for a user to combine low-cost, consumer-level hardware to add advanced storage features to a computer system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
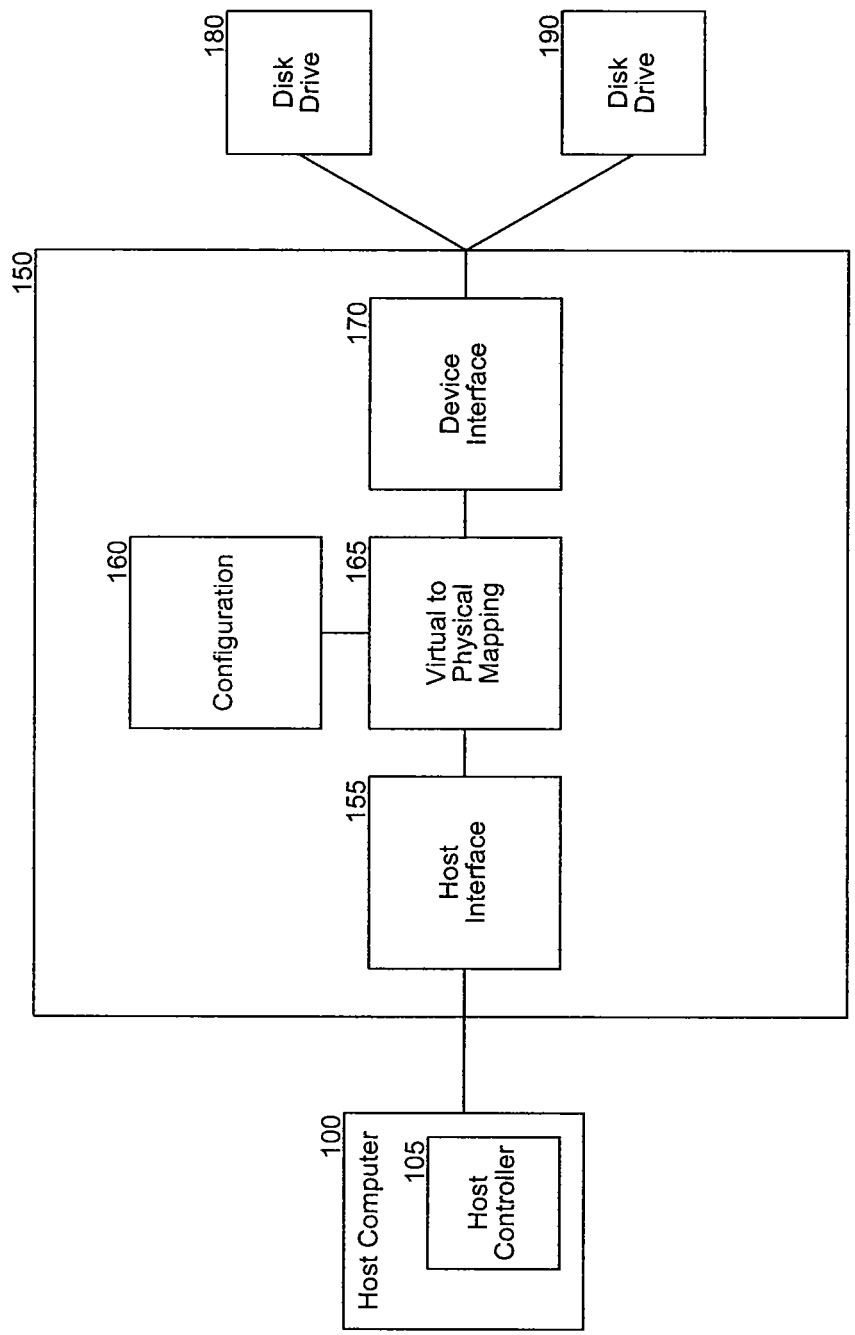
FIG. 1 is a block diagram that illustrates components of the advanced storage system in one embodiment.

A method and system for providing advanced storage features using commodity, consumer-level storage devices is provided. For example, the advanced storage system allows the use of multiple off-the-shelf hard drives to provide a fault tolerant storage system. The advanced storage system is a component that is connected between the computer system and one or more physical disk drives. The host interface of the advanced storage system presents itself to the computer system as a virtual disk drive that implements the commands of consumer-level storage hardware that are familiar to the host controller of the computer system. For example, the advanced storage system may appear to the computer system as a single hard drive. Similarly, the storage device interface of the advanced storage system presents itself to one or more disk drives as a consumer-level host controller, regardless of the actual topology of the physical storage devices that are connected. For example, the advanced storage system may be connected to two physical drives that are presented to the computer system as a single virtual disk drive, and each disk drive may believe that it is the only drive connected to the system. Each connection between the computer system, advanced storage system, and disk drives forms a data channel. First, the advanced storage system receives a command from the computer system to the virtual drive, and maps the command to one or more physical commands. For example, the storage system may receive a command to read one megabyte of data from a location on a virtual drive that is actually stored on two different physical drives. Next, the mapped physical commands are sent to the physical disk drives to perform the substance of the command. For example, the virtual read command may be broken into two separate read commands that are sent to each of the physical disk drives, each to read a different portion of the data. Finally, replies from the physical disk drives are combined and a single reply to the virtual command is sent back to the computer system. For example, data read from two separate disk drives may be combined into a single reply just as if the data had been received from a single disk drive. To reduce costs, the advanced storage system may be provided on a single chip. This system provides a simple way for a user to combine low-cost, consumer-level hardware to add advanced storage features to a computer system.

In some embodiments, the advanced storage system is configured to provide specific features during manufacturing such that no consumer configuration is necessary. For example, the advanced storage system may be configured to concatenate additional disk drives that are connected to it. The consumer purchases the advanced storage system and several hard drives. The computer system sees a single virtual drive that increases in capacity as each new drive is attached to the advanced storage system. The consumer can even purchase additional drives later to add more storage capacity without reconfiguring the host system. The advanced storage system may also be configured to provide mirroring to prevent loss of data. As the consumer connects additional hard drives, the data on each hard drive is mirrored on the other drives such that if one drive fails the data can be accessed (e.g., read from, written to, etc.) on another disk drive. The configuration of the advanced storage system may be through a series of hardware pins or jumpers, or by flashing a particular firmware image to the system during manufacturing. For example, the system may use a policy table to specify configuration information in the form of behavior directives. When control logic within the device reaches a decision point and must select a course of action from multiple possibilities, the table is consulted and the action specified by the table is performed. This allows the same hardware to be used to expose different features simply by modifying the contents of the policy table. Hardware pins may also be provided that override particular policies in the policy table to allow for additional configurability without modifying the policy table.

In some embodiments, the advanced storage system can be cascaded with other such systems to provide additional storage features. For example, one instance of the advanced storage system may be connected to the host computer system, and another instance of the advanced computer system may be connected to the first instance. In this way, complex storage topologies can be easily assembled by the average consumer. For example, one instance of the advanced storage system configured to concatenate connected devices can be connected to the host controller, and additional instances configured to provide mirroring of connected drives can be connected to the first instance such that a high capacity, mirrored virtual storage device is created. The host system may still only see a single large disk drive and can use standard disk drive commands to communicate with the connected storage devices. Each instance of the advanced storage system translates virtual commands received on the host interface to physical commands sent to each of the connected drives on the storage interface (which can in turn be treated as virtual commands by the cascaded advanced storage system instances).

In some embodiments, the advanced storage system separates the acknowledgement cycle between the host and the advanced storage system and the acknowledgement cycle between the advanced storage system and the connected devices. For example, the advanced storage system may speculatively acknowledge that data has been written in response to a virtual command received on the host interface, even before the physical drives performing the command have acknowledged the success or failure of the operation. In a topology where multiple physical drives are cascaded using the advanced storage system, speculative acknowledgements increase performance by reducing the latency caused by delays at each layer between the time a command is received and the time the command is completed and acknowledged. The system may also hide retrying of physical commands that fail from the host computer system by responding to the request indicating success, and then retrying the physical command until it succeeds. In some cases an overall storage operation is being performed in pieces such as writing a large amount of data in chunks such that if the advanced storage system speculatively acknowledges the success of writing one chunk that eventually fails, the system can report that the overall storage operation failed. This allows the system to gain additional performance while maintaining the integrity of the host system's view of the success or failure of the operation.

In some embodiments, the advanced storage system aggregates several slower data channels into one faster data channel. For example, if the advanced storage system is connected to two physical disk drives that implement the SATA I specification with a data transfer rate of 1.5 gigabits per second (Gbps), then the advanced storage system could present a SATA II specification host interface to the computer system with a data transfer rate of 3.0 Gbps. The advanced storage system reads and writes from the disk drives in parallel, and the computer system benefits from the combined throughput of the two drives.

In some embodiments, the advanced storage system automatically chooses the route for sending storage commands among multiple drives and cascaded advanced storage system components. The advanced storage system may use a mesh topology to access each drive in a way that reduces latency by minimizing the number of hops between drives and the host computer system. For example, multiple advanced storage system components may be connected to form a mesh. Commands can be routed within the mesh in many different ways. For example, a command to a drive could be sent through a chain of 10 advanced storage system components, but this would lead to a very high latency for completing the command. Instead, the advanced storage system components will communicate with each other to choose the quickest path to the cascaded disk drive.

In some embodiments, the advanced storage system automatically reconfigures itself when new drives are attached. For example, when a user attaches a fourth drive to a system, then the advanced storage system may automatically concatenate the drive with the other drives to grow the size of the existing virtual volume. Similarly, the advanced storage system may automatically use the new drive as a mirror for the other volumes. The decision may be based on a number of factors, such as the configuration of the advanced storage system, the size of the existing and new drives, and the speed of the drives. For example, if the configuration indicates that mirroring should be performed, the advanced storage system may use a single, connected 75 gigabyte (GB) disk drive to mirror three other connected 25 GB drives. Similarly, if two 1.5 Gbps drives are already connected, the system may configure a new 3.0 Gbps drive as a mirror since it can be written to in the same amount of time that the two original drives can be written to in parallel. Because the system does not require external configuration, it can be used in situations where other storage systems cannot. For example, set-top boxes, personal video recorders, MP3 players, and other embedded devices all can benefit from additional storage and advanced features such as fault tolerance, but lack a configuration user interface or in some cases even hardware for displaying a configuration user interface that other storage systems would require.

In some embodiments, the advanced storage system records the serial number of attached physical drives in the virtual-to-physical translation state information. Identification of the drive allows for more sophisticated policies in response to external events, such as the attachment of a new or previously seen drive. When a drive is inserted, it is compared with the list of known physical devices. If the newly attached drive is recognized, but attached to a different physical interface, the translation information is automatically updated to account for this re-positioning. If the drive is not recognized, some embodiments of the advanced storage system will update the translation information to add the new drive (or portion thereof) in any of the possible enhanced access modes available (e.g. mirror, stripe, concatenation). In some embodiments of the advanced storage system, the new physical drive is not added to the translation, thereby preventing access to it until additional user action is taken. The advanced storage system can provide various drive locking features to secure access to the physical drives. Modern SATA disk drives support commands from the host to lock and unlock the drive and store a password within the drive itself. In one embodiment, the virtual-to-physical translation of drive access commands includes support for such drive locking commands. For example, when a request to lock (or unlock) a (virtual) drive is received from the host, the command is forwarded to the appropriate set of physical drives. Such embodiments allow a host device to bind a virtual drive to itself, rendering all physical drive components of the virtual drive inaccessible by any other host device (without the appropriate password). In some embodiments, the advanced storage system performs all drive locking tasks internally. When a new physical drive is attached, a drive lock request is sent to the drive, and the password is stored in the virtual-to-physical translation state information. Subsequently, when an access request for a virtual drive is received on the host interface, it is translated into a set of accesses to the appropriate physical drives, each preceded by a drive unlock request that uses the previously stored passwords. This binds the physical drives to a particular instance of the advanced storage system, rendering them inaccessible by any other host device (without the appropriate password).

FIG. 1 is a block diagram that illustrates components of the advanced storage system in one embodiment. A host computer system 100 is connected to the advanced storage system 150, and the advanced storage system 150 is connected to one or more disk drives (e.g., 180 and 190). The host computer system 100 contains a host controller 105 for communicating with storage devices, such as a disk drive or the advanced storage system 150. The advanced storage system 150 contains a host interface component 155, a configuration component 160, a virtual to physical mapping component 165, and a device interface component 170. The host interface component 155 communicates with the host controller 105 to perform storage commands. The storage commands received from the host controller 105 are treated as virtual commands to a virtual drive presented to the host computer system 100 by the advanced storage system 150. The configuration component 160 stores configuration information about the advanced storage system 150 such as how many drives are connected and which storage features each drive is being used to provide (e.g., striping, mirroring, and concatenation). The virtual to physical mapping component 165 maps virtual commands received from the host interface 155 to physical commands issued to the device interface 170, based on the configuration stored by the configuration component 160. The virtual to physical mapping component 165 also maps physical responses received from the device interface component 170 to a virtual response sent to the host computer 100 via the host interface 155. The device interface component 170 communicates with one or more physical disk drives (or additional advanced storage systems) to perform storage commands.

The computing device on which the system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
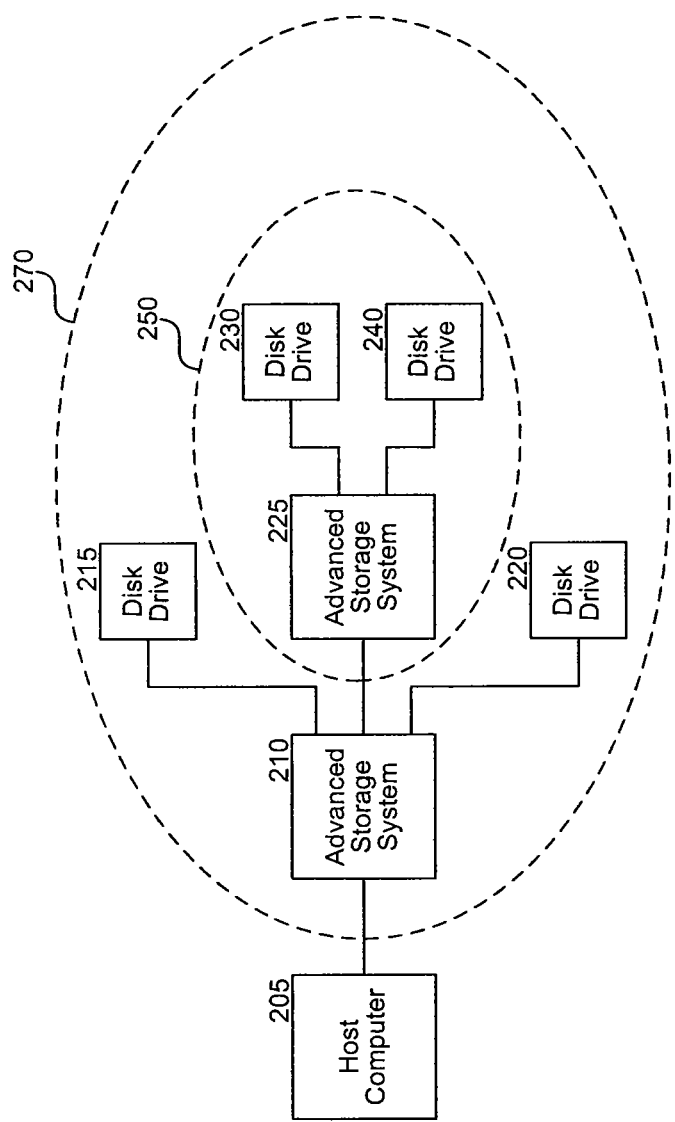
FIG. 2 illustrates a topology of cascaded advanced storage system devices in one embodiment.

FIG. 2 illustrates a topology of cascaded advanced storage system devices in one embodiment. A host computer 205 is connected to an advanced storage system component 210. The advanced storage system component 210 appears to the host computer 205 as a single, standard disk drive 270. The advanced storage system component 210 is connected to a first disk drive 215, a second disk drive 220, and another advanced storage system component 225. The advanced storage system component 225 and associated disk drives 230 and 240 may appear to the first advanced storage component 210 as another disk drive 250 in this embodiment, or the two components may have a private communications channel (such as an independent connection or a custom protocol sent over the data channel) that allow the two components to be aware of each other and exchange configuration information. The second advanced storage system component 225 is connected to a first disk drive 230 and a second disk drive 240.

The system may be configured in many ways. For example, the first advanced storage system component 210 may be configured to provide concatenation of the two drives 215 and 220, and the second advanced storage system component 225 may be configured to provide a mirror of the concatenated disk drives 215 and 220 using the other pair of disk drives 230 and 240.

Figure 3:
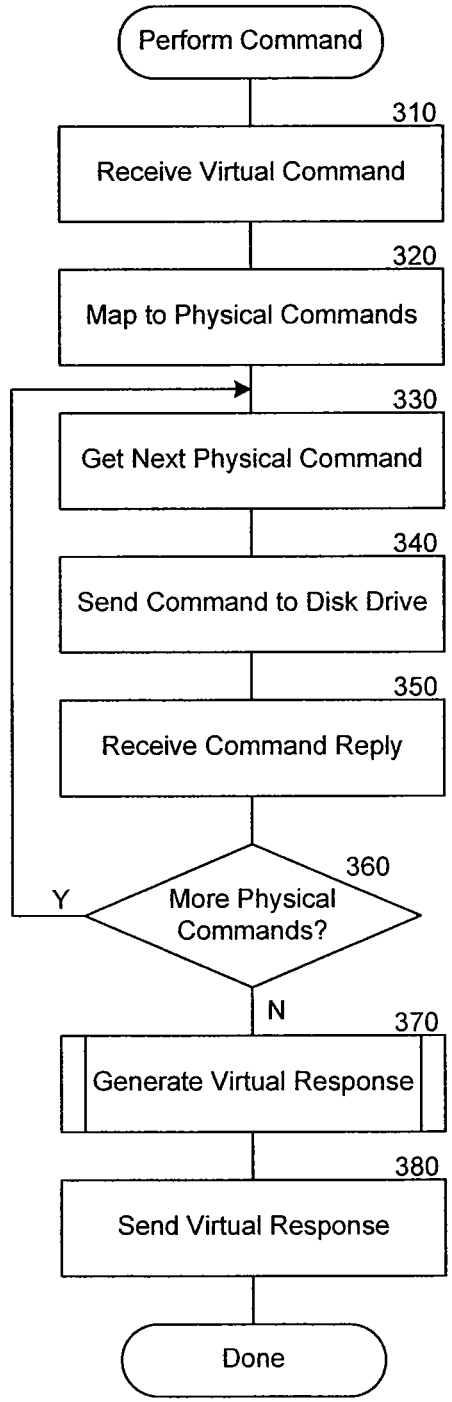
FIG. 3 is a flow diagram that illustrates the processing of the virtual to physical mapping component of the system in one embodiment.

FIG. 3 is a flow diagram that illustrates the processing of the virtual to physical mapping component of the system in one embodiment. The component is invoked when a command is received from the host interface of the advanced storage system. In block 310, the component receives a command directed to the virtual disk drive provided by the advanced storage system. In block 320, the component maps the virtual command to one or more physical commands. In block 330, the component gets the next physical command produced by the mapping. In block 340, the component sends the physical command to the appropriate physical device. In block 350, the component receives a reply from the physical device to the command. In some embodiments, the component may not wait for the reply from the physical device. For example, the component could assume that the command will succeed and respond to the virtual command before all physical replies are received, or the component may wait until all physical commands are sent before checking for physical responses. In decision block 360, if there are more physical commands produced by the mapping, then the component loops to block 330 to get the next physical command, else the component continues at block 370. In block 370, the component generates a virtual response based on the received physical responses, if any. In block 380, the component sends the virtual response to the computer system or device from which the component received the virtual command. The component then completes.

Figure 4:
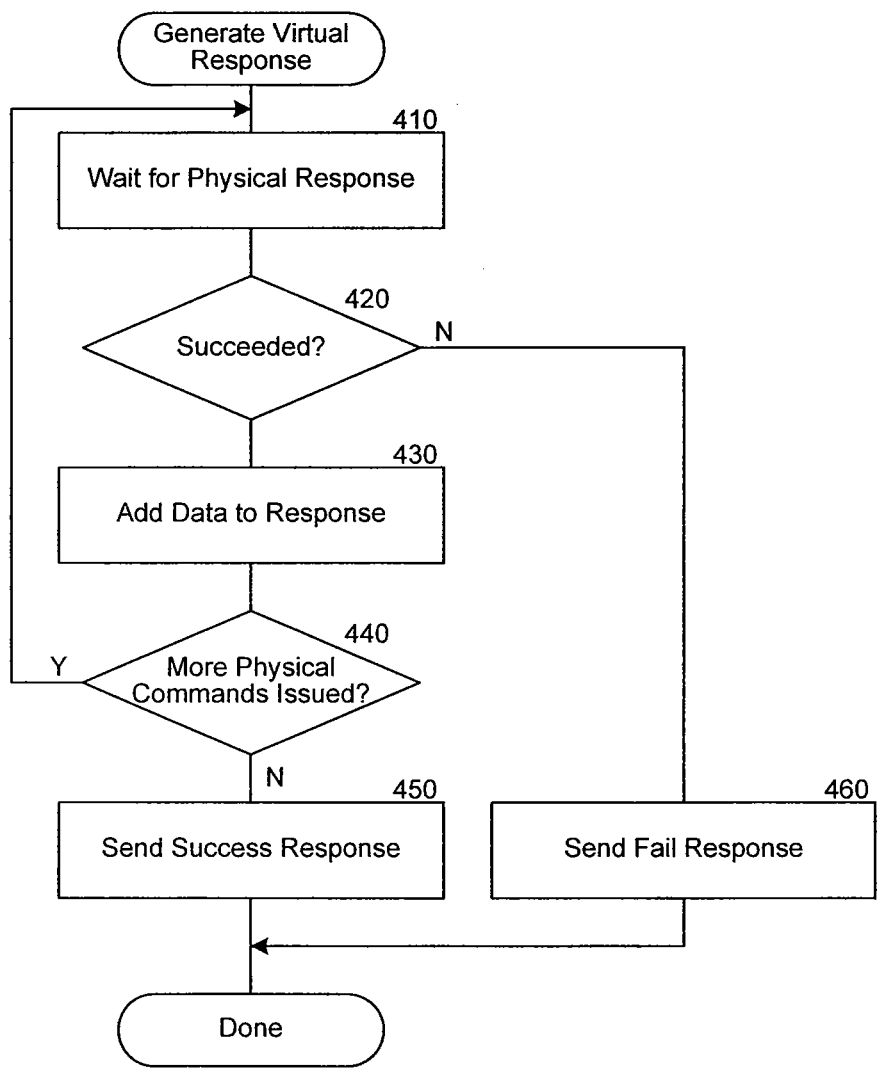
FIG. 4 is a flow diagram that illustrates the processing of the virtual to physical mapping component to generate a virtual response in one embodiment.

FIG. 4 is a flow diagram that illustrates the processing of the virtual to physical mapping component to generate a virtual response in one embodiment. In block 410, the component waits for a physical response to a physical command issued to a disk drive or other device. In decision block 420, if the physical command succeeded then the component continues at block 430, else the component continues at block 460. In block 430 the component adds any data from the physical response that should be included in the virtual response (such as if the physical command read data from the disk drive) to the virtual response. In decision block 440, if there were more physical commands issued, then the component loops to block 410 to wait for the next physical response, else the component continues at block 450. In block 450, the component reports the success of the virtual command by sending a success response and any included data. In block 460, if the command failed then the component sends a fail response indicating that the virtual command did not succeed. After a success or fail response is sent, the component completes.

Additional Embodiments

Several additional embodiments of the advanced storage system will now be described. The first embodiment describes an architecture for the advanced storage system, called SteelVine. Other embodiments, such as Polaris, Pico, and Milkyway, describe hardware embodiments of the SteelVine architecture that provide a complete storage system on a chip solution that make advanced storage features accessible to the consumer market.

The SteelVine Architecture builds on the recently defined SATA storage interface standards to create an entirely new category of product: i.e., a Storage Subsystem on a Chip (SSoC). The SteelVine architecture-based SSoCs comply with all of the SATA specifications, but Interpret and make use of them in new and novel ways. This architecture makes use of the new SATA standard to bring functionality that was previously only available in high-end, enterprise-class, storage subsystems, to the high-volume, low-cost, commodity-based computing arena.

The SteelVine components extend the standard Port Multiplier concept to include high-level enterprise storage capabilities such as: the ability to flexibly virtualize a set of physical drives, support for Native Command Queuing (NCQ), as well as RAID (−1, 0, 1, and 10) capabilities. For this reason, we say that the first of the SteelVine products provide "enhanced" Port Multiplier functionality.

In some embodiments, these products are implemented as heavily hardware-supported, micro-code-intensive, Storage Subsystems on a Chip (SSoCs). From the perspective of standard SATA host adaptors and disk drives, these products appear as a "bulge in the SATA cable"—i.e., they appear as Targets to hosts and vice versa. In order to create the illusion of virtual drives with different properties from those of the available physical drives, command packets generated by the host and directed to Virtual Drives are transformed into new command packets directed at the attached physical drives. This transformation done by the SSoC happens at wire-speed, based on configuration data contained within the component. This transformation may also involve the generation of multiple physical drive commands in response to a single incoming Virtual Command (e.g., to do multiple writes on a mirrored Virtual Drive, to do a read that spans multiple, concatenated drives, etc.).

It is important to note that, despite similarities in high-level descriptions, the SteelVine SSoCs are architecturally and functionally quite different from standard external RAID controllers. In particular, the SteelVine Components are not implemented as software on top of general-purpose processor hardware. This means that the SteelVine SSoCs can achieve wire-speed performance at much lower cost and complexity, on the scale of simple, low-cost, single-chip dumb Port Multiplier components. Complexity is reduced and management costs are eliminated by applying simple brute-force solutions to many problems. For example, simple mirroring is used to provide enhanced reliability. This solution requires much less in the way of processing and memory resources than traditional parity-RAID solutions, and achieves its reliability through the expenditure of low- (and ever-decreasing) cost disk drives.

In some embodiments, the SteelVine Architecture delivers storage by way of an appliance model. Users do not have to understand (or even know) anything about what is going on, they simply get the functionality they desire, in terms they understand (e.g., big, fast, reliable, etc.), at a cost they are willing to pay for the service provided. This appliance-based approach helps to sell high volume products. The high-volume category of user cannot be expected to know what RAID means, much less understand how it works well enough to determine which configuration options are right for them. Furthermore, the appliance approach minimizes the interface between the storage services and the host computers. This is a major advantage to the user as it means that the desired storage service can be obtained without changes or configuration to the host. A storage device that looks like a physical disk to the host hardware, BIOS, OS, and applications can deliver advanced functionality without modifying or adding anything to the host.

Through careful separation of policy and mechanism, the SteelVine Architecture makes it possible to apply the SSoCs in a wide range of different usage scenarios—from fixed configurations that come from the factory set up to do everything with no user setup required (e.g., multi-drive units that look like a single drive—i.e., duplex drives, or four 2.5" drives in a 3.5" envelope with single power connector and Host Port), to highly-scalable, high-touch, RAID arrays that allow policies to be defined by users and each activity of the array to be carefully monitored and logged.

The following sections define the system context in which products based on the SteelVine Architecture operate, describe the key features provided by this architecture, and provide an overview of the major implementation issues surrounding storage subsystems that use the Polaris and the Milkyway hardware.

SteelVine Storage Subsystem Overview

SATA was designed as a point-to-point connection between a host bus adaptor (HBA) and a disk drive. Since the bandwidth of SATA links (i.e., 1.5 Gbps, 3 Gbps, or 6 Gbps) exceeds that of current hard drives, it is possible to connect multiple drives to a single SATA (Host) port and not exceed the bandwidth capabilities of even the slowest SATA link. For this reason, the SATA Port Multiplier (PM) specification was defined, permitting multiple drives to be attached to a single Host Port. While the SATA PM specification defines a simple mux- or hub-type device, Silicon Image has extended this specification to create a new type of device, an Enhanced Port Multiplier (EPM). An EPM is a Storage Subsystem on a Chip (SSoC) that provides, in addition to the basic hub-like function of a PM, functionality traditionally associated with large, costly, complex, storage array controllers.

The SteelVine components transform a collection of physical drives into some number of virtual drives, each of which can have properties that are enhanced over those of the physical drives from which they are composed (e.g., bigger, faster, or more reliable). In addition, the more advanced SteelVine components (e.g., Milkyway) have an added mesh routing capability that provides scalability by allowing the components to be connected into a fabric. This allows the mapping of a potentially large set of physical drives onto a set of Virtual Drives available to a potentially large set of hosts.

One design objective of the SteelVine family of components is to perform all of the desired physical drive enhancements in a manner that is completely transparent to the host. Effectively, a SteelVine component appears as a "bulge" in the wire; it looks like a PM to a host and looks like an HBA to a drive. From the perspective of the host, it can be effectively impossible to differentiate between the virtual drives provided by the SteelVine component and physical drives with the same properties (e.g., size, speed, or reliability). This ensures interoperability with a wide variety of host systems, and eliminates the need to develop, install, and support a large suite of custom host-side (application, driver, BIOS, etc.) software.

The initial products in the SteelVine family (i.e., the standalone PM and EPM (Polaris), and scalable EPM (Milkyway)) are designed to deliver complete storage subsystem capabilities in a single, highly integrated Storage Subsystem on a Chip (SSoC). While the SteelVine Components (with their associated on-chip embedded software) do provide nearly complete storage subsystem functionality, a small number of additional components (e.g., an external EEPROM, LEDs, an LM87 environmental control component, etc.) may be required to create a complete storage subsystem. The components required for a complete subsystem, as well as all of the major entities that comprise a complete Polaris-based storage subsystem are described below.

Application of the SteelVine Architecture

The following paragraphs provide a description of where the SteelVine Architecture fits in the hierarchy of storage interfaces, how this architecture relates to other existing architectures today, and how products based on this architecture might appear.

The SteelVine Architecture is based on the concept of creating Virtual Drives that have enhanced properties over those of the Physical Drives from which they are created. In this architecture, these enhancements are provided while presenting the same interface to the host that a Physical Drive would have. As a result, the SteelVine Architecture can deliver benefits to any system that supports SATA storage, without requiring additions or modifications to the existing host software. This makes the SteelVine Architecture independent of BIOS, device driver, file system, OS, or application software, and capable of being introduced without the typically large burden of compatibility testing requirements. It also removes any opportunity for the type of unforeseen and undesirable interactions between enhanced storage functionality and the host systems that is typically associated with the deployment of RAID hardware.

The ability to introduce storage functionality enhancements at this low level of abstraction provides a wide range of benefits. The SteelVine Architecture is centered on one of the lowest levels of the storage Interface hierarchy: the block access interface. The only levels lower than this are the Physical, Link and Transport interface layers of given types of drives. Within a family of drive protocols (e.g., SCSI), there may be many different sub-protocols (e.g., Ultra320), as well as many different types of physical, link and transport interfaces (e.g., SAS, optical/copper FC, etc.). While many differences exist in the native interfaces presented by different types of disk drives (and the specifics of the drives' block-level protocols may also differ greatly in their specifics), the general abstraction of block access provided by modern disk drives remains common among all types of drives.

In the most general sense, all currently popular disk drives provide a common set of read/write block semantics that follow these principles:

the Initiator (e.g., the host) issues a command to a selected Target device (e.g., Physical Drive);

the command contains an opcode that indicates the type of command to be performed (e.g., read, write, etc.), the address of a starting block, and a count of how many blocks following the start are to be affected;

if the command is a read operation, then the Target device responds with the desired number of blocks, read from the drive starting at the given block address;

if the command is a write operation, then the indicated number of blocks to be written to the drive (starting at the given block address) will be provided by the Initiator following the command.

While the details and terminology vary, the general nature of the block level interface is the same regardless of what kind of drive is involved. The most common drive protocols today are known as SCSI and ATA. These protocols each have a different way of referring to Target devices (e.g., Logical Unit Number (LUN) versus Target Port address) and storage locations (e.g., Block Number versus Logical Block Address). However, both SCSI and ATA fundamentally operate in largely the same fashion; they provide read and write operations of some given number of fixed-sized units (i.e., blocks or sectors), based on a given starting address.

Comparing SteelVine to Other Storage Subsystem Architectures

To help appreciate the SteelVine Architecture, the dominant storage architectures of today are examined. The simplest and most common type of storage architecture is known as Direct Attached Storage (DAS). In DAS, disk drives are attached to individual hosts by way of HBAs. While there are several variants of this approach (e.g., involving multi-drop buses or hubs/muxes/switches) that allow multiple drives to be connected to a single HBA port, it is typically the case that each drive is connected to a single host at any point in time. The DAS model provides storage to hosts at low cost and complexity, where the cost is a function of the number of drives, cables, and HBAs attached to a host, and the complexity involves the installation of an HBA (and its necessary drivers and supporting software), and the attachment of drives to the HBA's storage ports. In systems that include more than one host, this approach has the drawback of poor utilization, resulting from the storage resources being partitioned and each drive being bound to a single host. In such a situation, it is likely that some hosts have too much capacity, while others have too little. The only solution is to add additional drives. However, the addition or movement of drives in the DAS architecture can be a complex and costly (in terms of time and effort) exercise, as hosts must frequently be shut down in order to add or remove drives. In addition to this, the reliability and availability of DAS subsystems tends to be somewhat less than desired. This is due to the fact that the failure of any host, drive or cabling harness results in the loss of access to the data on the affected drives.

The Storage Area Network (SAN), was developed to address the shortcomings of the DAS architecture for large-scale enterprise systems. In this architectural approach, a specialized storage network is defined (i.e., Fibre Channel (FC)), that allows a collection of drives to be connected to a set of hosts in a (more-or-less) flexible fashion. In a SAN, it is possible to sub-divide drives and assign their various partitions to specified hosts. It is also possible for alternate hosts to take over a set of drives should a particular host fail. This architecture has the advantage of allowing drives (and portions thereof) to be flexibly (and somewhat dynamically) reassigned to hosts, thereby yielding greater availability of data and higher utilization of drives than is possible with the DAS architecture. However, the SAN architecture comes with substantial costs in terms of both the price of the storage (including the drives, cabling and controllers), and in the complexity of setting up and managing the storage subsystem.

Both the DAS and SAN architectures are storage subsystems that operate at the block level. However, the next architecture, known as Network Attached Storage (NAS), operates at the file level of abstraction. The NAS architecture involves a host that acts as a File Server, connecting (commonly by way of a DAS architecture) to a collection of drives and delivering file access to other hosts over a (typically local-area) network. Because the NAS architecture operates at a different level of abstraction, it is not possible to make .direct comparisons between its characteristics (e.g., price, performance, complexity) and those of the other architectures described here.

Figure 5:
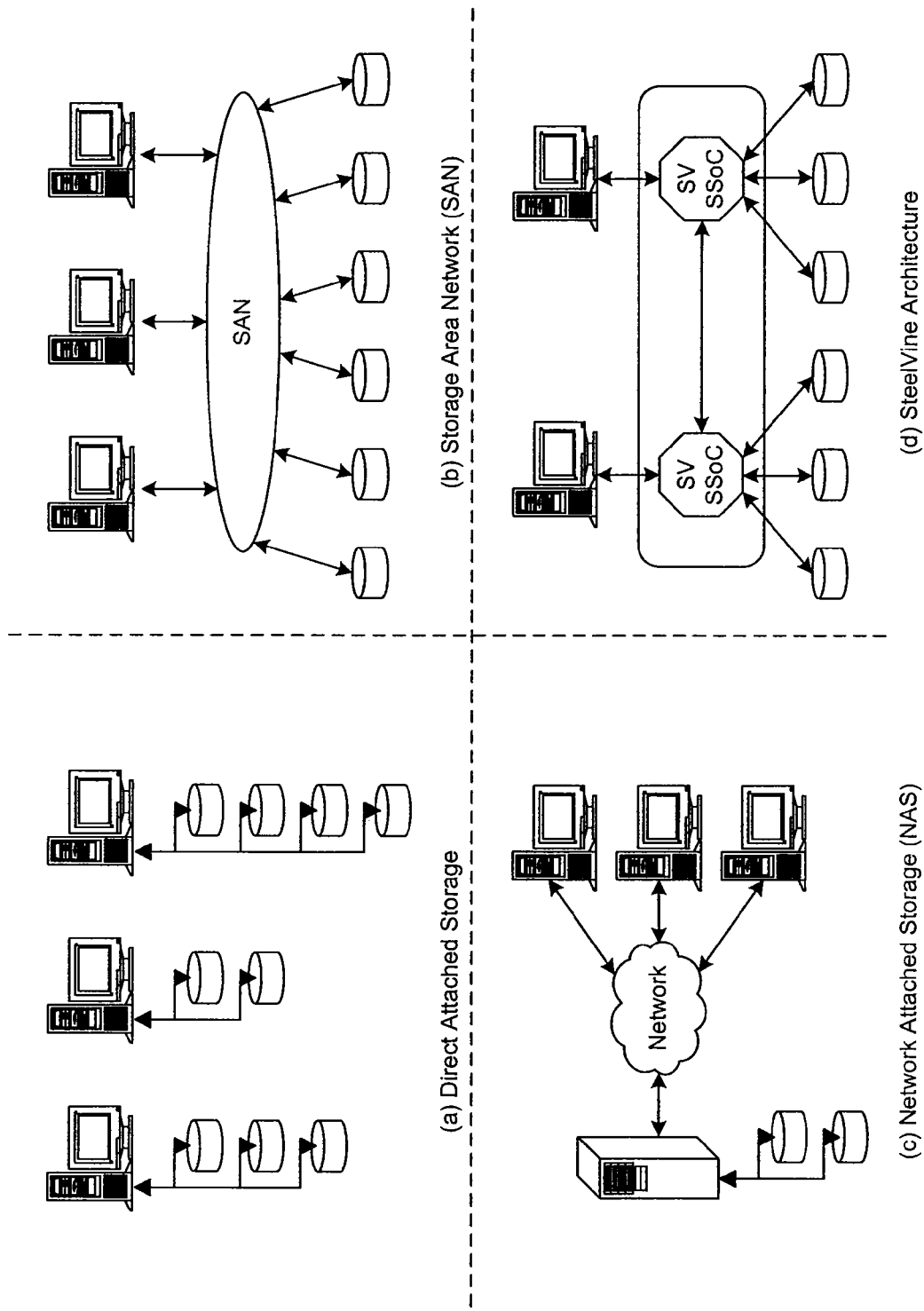
FIG. 5 illustrates various storage architectures in one embodiment.

Finally, the SteelVine architecture is illustrated in FIG. 5, which shares characteristics with both the DAS and SAN architectures. In a sense, the SteelVine architecture offers a "SAN-in-a-box," where the storage capacity represented by an array of drives can be associated with a set of hosts in a straight-forward and cost-effective manner. The SteelVine Architecture delivers the flexibility and availability of the SAN architecture, at the levels of cost and simplicity of the DAS architecture. In addition, the SteelVine Architecture addresses the block-level of the storage hierarchy, and as such, provides benefits for the file server element in the NAS architecture.

It should be noted that the different RAID levels are not addressed here. They do not represent storage architectures, but rather a series of storage subsystem implementation techniques for providing enhanced levels of storage functionality. In some embodiments of the SteelVine Architecture, the desired levels of performance and reliability are created by way of simple, brute-force means (e.g., mirroring, as opposed to parity-RAID) to meet price/performance objectives and to satisfy the requirements of the high-volume, cost-sensitive target markets chosen for the initial SteelVine products. One of ordinary skill in the art will appreciate that other common approaches can also be used to implement RAID functionality (e.g., parity RAID).

Example Embodiments of the SteelVine Architecture

The SteelVine Architecture's ability to create Virtual Drives with different (and enhanced) properties beyond those of the physical drives from which they are created can be applied in a number of different scenarios, ranging from small numbers of drives connected to a single host to large arrays of drives serving a large set of hosts. At the low end of this spectrum, several (e.g., two to four) 2.5" drives could be combined with a single SteelVine SSoC to create a module that fits within a standard 3.5" drive's envelope and has a single SATA port and a single power connection. While physically appearing to be a single 3.5" drive, this type of unit could offer a variety of different features, including a highly reliable (i.e., transparently mirrored) drive, or multiple virtual drives (each with their own specialized characteristics with respect to size, performance, and reliability). Similarly, multiple (e.g., two to four) 3.5" drives could be combined into a Brick, also with a single SATA and power connection.

Figure 6:
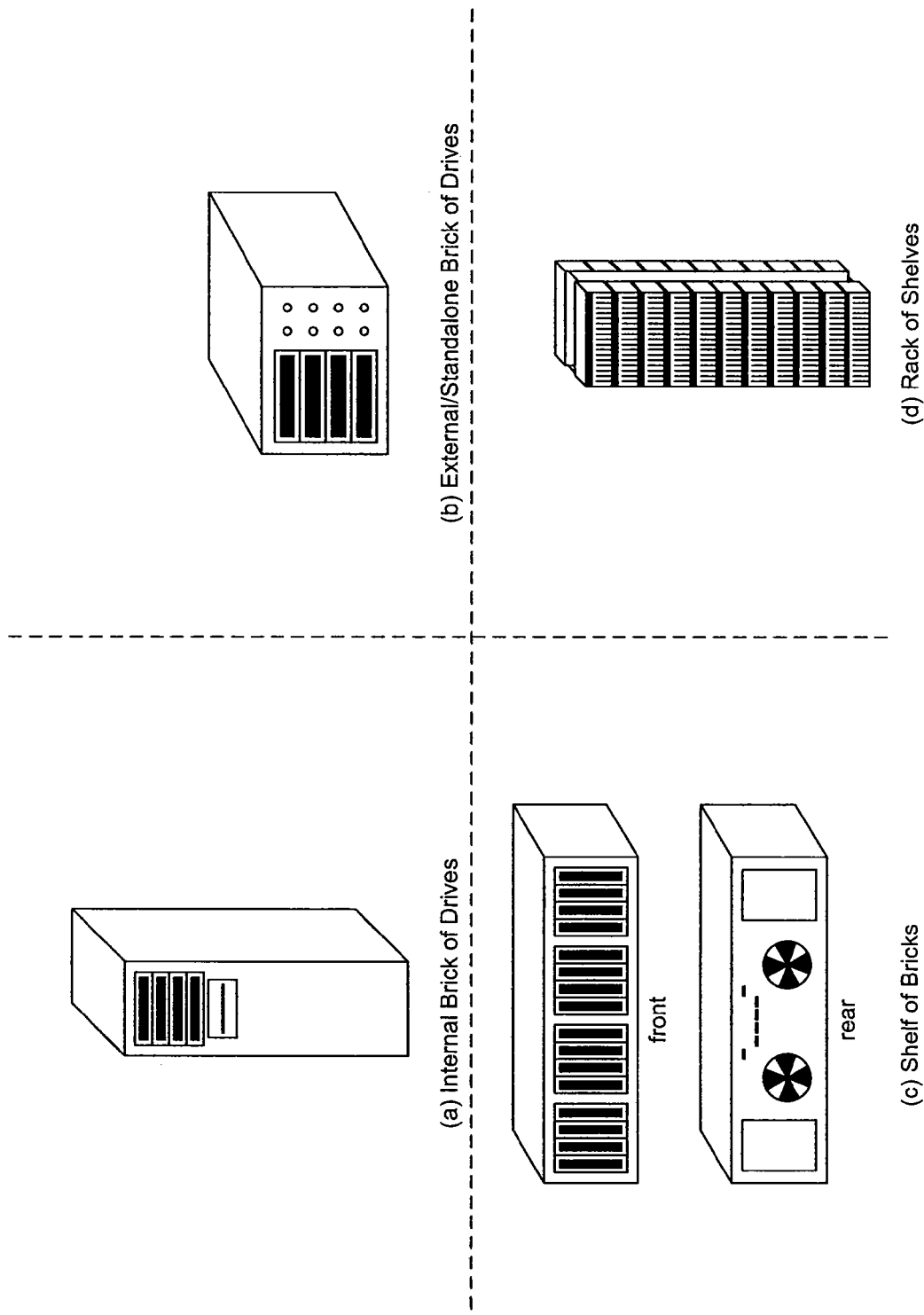
FIG. 6 illustrates various applications of the SteelVine architecture in one embodiment.

A Brick can be used as the basic building block in the construction of a variety of different types of storage arrays. FIG. 6 shows some of the different types of structures that can be created with Bricks. In FIG. 6a, a four-drive Brick is used as a single storage unit within a standard desk-side PC tower. In this application, the Brick occupies only a single SATA connection to the motherboard, regardless of the number of Virtual Drives it presents. This can be an advantage where SATA ports are available in limited numbers. FIG. 6b illustrates the same basic Brick in a standalone, external configuration. In this application, the Brick has its own enclosure and power supply, and is attached to a host by way of an external SATA (eSATA) connection. The standalone Brick can also have an additional interface (e.g., RS232, USB, Ethernet, etc.) for out-of-band monitoring or control of the array. Bricks can also have a memory-device port (e.g., Compact Flash) to allow configuration information to be loaded into, or saved from, the Brick's SteelVine SSoC.

Using the scalability features of the SteelVine Architecture, several Bricks can be combined into a rack-based storage array (known as a Shelf) as shown in FIG. 6c. In this example, four Bricks share a pair of redundant power supplies and each Brick is connected to a central controller that can offer additional functionality (e.g., parity RAID, translation to another storage interface such as FC or SCSI, etc.). The Shelf's drives can all be connected via SteelVine SSoCs, and they can be connected to one or more hosts or controllers by way of eSATA connections.

Finally, FIG. 6d presents an example where multiple Shelves are connected together to create a storage Rack. This kind of storage Rack can be configured in a variety of different topologies, depending on how the drives within each Shelf are connected to SteelVine components, and how the components in the Shelves are interconnected. In an extreme case, the entire Rack might connect to a host through a single SATA connection.

Storage Array Controller Components

Figure 12:
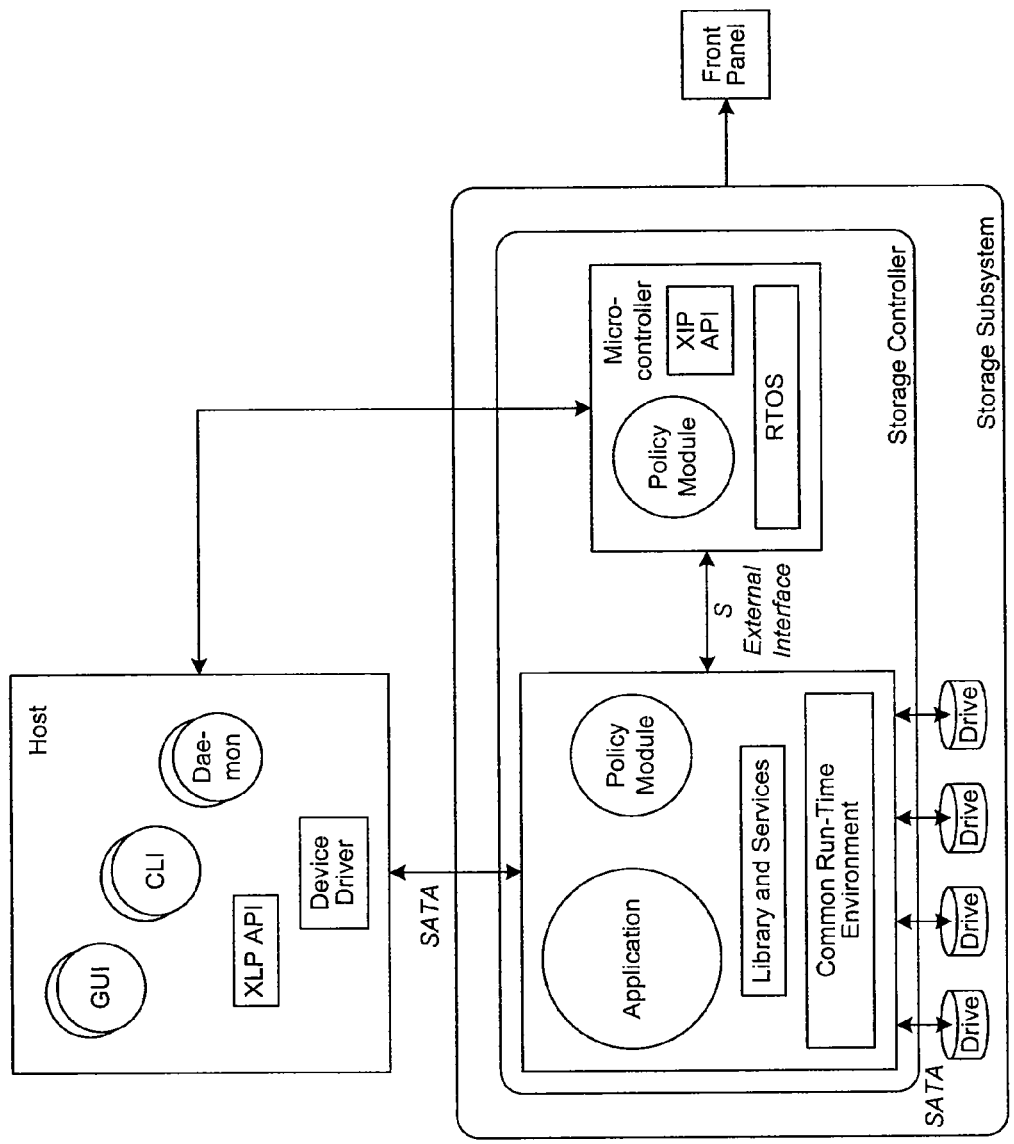
FIG. 12 illustrates a high-level view of the storage subsystem software components in one embodiment.

Typical Polaris-based storage subsystems consist of three top-level types of entities—hosts, Storage Array Controllers, and drives—as illustrated in FIG. 12. This figure also illustrates the top-level hardware and software components that go into the making of a SteelVine-based storage subsystem. As illustrated, the host hardware includes some form of Host Bus Adaptor (HBA) that connects the host's internal I/O bus to the storage interconnection link(s) that connect to the Storage Array Controller.

Some Storage Array Controllers support connections in addition to their primary storage interconnection links. These links can be intended for only sporadic use (e.g., at the factory, for reconfiguration in the field, etc.), or they can provide "chronic" attachments that allow dynamic access to the Storage Array Controller (for such things as monitoring, code updates, policy inputs, etc.). We refer to these "out-of-band" mechanisms as supplemental interconnection links. These out-of-band communications channels could be implemented with a variety of different communications technologies (e.g., Ethernet, USB, RS232, WiFi, etc.), and may have a wide range of different communications protocols layered upon them (e.g., HTTP, TCP/IP, proprietary protocols, etc.). The same functionality provided by the out-of-band channels, can also be provided by "in-band" communications channels—i.e., by creating sub-channels within the primary storage interconnection link (e.g., SATA).

In addition to supplemental communications links, a storage subsystem might also offer an externally accessible set of I/O devices known here as a "Front Panel." The Front Panel might offer anything from simple LED and switch I/O, to highly elaborate color, touch-screen LCDs with audio output. Like the out-of-band channels, Front Panels can present users with status information about the Storage Subsystem, and can take input from users for configuration and management purposes. A Front Panel might also offer users a form of removable, non-volatile storage interface (e.g., USB, Compact Flash, etc.) that can be used to backup and restore the Storage Array Controller's configuration and status information.

In order to support a wide variety of Out-of-Band interfaces, as well as a wide range of different types of Front Panels, the current generation of SteelVine SSoCs has been designed to include a simple interface to an external microcontroller. An appropriate external microcontroller can be chosen to handle the desired out-of-band communications link, as well as the desired form of Front Panel. The external microcontroller easily interfaces to the SSoC via an external control interface. As will be described later, this sort of external microcontroller can also be used to implement the policies for a given storage subsystem.

It is noteworthy that each of these latter functions could be handled by separate microcontrollers, or several (or even all) of these functions could be combined into a common microcontroller. For simplicity, in this discussion, we describe a single external microcontroller that handles all of the desired functionality. The examples in this document use a single SSoC; however the SteelVine Architecture allows the combination of multiple SSoCs into a single logical entity, with much the same performance and functionality of a single SSoC with the sum of the collection's resources. Therefore, a single SSoC can be used as a simplified representation of a collection of scalable components (e.g., Milkyway).

Hardware Components

The Storage Array Controller hardware typically includes components that manage the interconnection of multiple drives to the host's storage link, as well as other hardware units that manage assorted activities related to the physical packaging of the assembled collection of drives. These physical drive-packaging related activities are commonly referred to collectively as Enclosure Management (EM), and include such functions as: controlling LEDs and monitoring power, fans, temperature, etc. SteelVine-based Storage Array Controller hardware consists primarily of (one or more) SteelVine SSoCs, and frequently include additional microcontrollers to handle Enclosure Management, out-of-band communications between the Host and the Storage Array Controller, and external policy logic for the SteelVine SSoC(s).

Within the Polaris SSoC, a Silicon Image proprietary embedded microcontroller (internally known as Pico) performs all initialization, control-plane, virtualization, and external interface functionality. The Pico CPU is a high-performance, low-cost, embedded 32-bit RISC processor with Harvard memory architecture (i.e., separate instruction and data memories). Instruction memory consists of 64 KB of on-chip SRAM, and data memory is comprised of 16 KB of on-chip SRAM. A separate control register address space is used to communicate with the various functional units on the Polaris chip.

The Milkyway SSoC provides a superset of Polaris' features, including the addition of a set of Inter-Switch Link (ISL) connections, a hardware-supported routing layer, an enhanced embedded processor (i.e., Pico II), and a crossbar (as opposed to a bus) for internal interconnection. The inter-Switch Link (ISL) ports and the routing hardware allow Milkyway SSoC's to be combined into a fabric that allows the functionality of Polaris to be scaled to include a larger number of Host and Drive Ports within a common storage subsystem. Further descriptions of the ISL links and their use to create scalable Storage Array Controllers will be provided in later sections.

Pico II is the second-generation embedded controller designed for the SteelVine family of SSoCs, and incorporates a number of improvements over the Pico I chip found in Polaris. Among the enhancements over Pico I included in Pico II are: the addition of four address breakpoint registers and single-stepping debug mode (both to support gdb-based debugging), relaxing of branch instruction alignment restrictions, and the elimination of unused (load and rotate) instructions. Despite their differences, the same tool chain supports both Pico I and Pico II.

Software Components

In addition to the hardware components defined above, a Polaris-based storage subsystem consists of a variety of different software components. At the top level, there are several distinct categories of software within this type of system, each distinguished by the level within the system at which it exists, the constraints posed by the environment within which it executes, and the nature of the software itself (e.g., degree of concurrency, real-time, etc.). The types of software within the host can be broken down into the following categories: device drivers, system software, and application software.

The device driver is code that manages the storage link by way of the HBA hardware and provides access to the features and capabilities of the storage subsystem for the higher-level software within the host. While this code should be largely unaware of Polaris being anything different from a standard PM, there are a number of vendor-specified extensions to the PM specification's register sets that the device driver may understand in order to make full use of the Polaris device. In addition, the device driver should support non-polling-based means of communicating subsystem-generated events. This means that some callback, or blocking ioctl type of mechanism needs to be supported in order to allow host software to become aware of significant changes in state within the storage subsystem (e.g., drives going on-/off-line, EM events, etc.). Similarly, should it be necessary to communicate with the Polaris subsystem via in-band communications (i.e., using the SATA link), the device driver should provide support for this (or, at the very least, not prohibit this from taking place). This is (typically) kernel-level code, that is highly OS- (and version-)specific, requires a deep understanding of kernel programming, and an intimate knowledge of much of the system hardware (including that of the host, HBA, Polaris, EM, and drives). Its efficiency is reflected in the overall system-level performance.

The system software consists of low-level system code that interacts with the device driver and performs functions that do not involve direct user interaction. For example, a daemon that monitors the storage subsystem and reports any anomalous conditions (e.g., drive failures, temperature or voltage excursions, etc.) could run in the background and register its interests with the device driver and get notified when any of its monitored events occur. Similarly, a daemon could exist to handle policy events (e.g., drive on-/off-line transitions) and perform updates to the SSoC state in response to the execution of some pre-defined policy logic (e.g., when a new drive is added, concatenate it to the end of a given logical drive or start a rebuild operation for a mirror set). This kind of code requires knowledge of systems-level (but not necessarily kernel-level) programming, as well as a moderately deep understanding of the features and function of the SteelVine-based subsystem. This tends not to be highly performance or resource-constrained code.

The application software runs as standard application programs on top of an OS and typically performs functions that involve direct user interaction—e.g., Graphical User Interface (GUI) or Command Line Interface (CLI) code that provides user access to the features offered by the storage subsystem. This kind of code requires more emphasis on the human factor aspects than on any of the specific technical details of the storage subsystem, and should focus on how the underlying capabilities are abstracted and presented to users. This code executes in a resource-rich environment, where the only performance issues tend to be ones associated with human interactions.

The software that exists within the storage subsystem breaks down into two broad categories: firmware and microcode.

The firmware is the code that executes on the supporting microcontroller(s) within the storage subsystem. This code performs such things as EM, external communications, and SteelVine policy functions and tends to execute in a more resource-constrained and performance-sensitive environment than the host software. Otherwise, this code is similar in nature to the system software described for the host above. This code may execute upon a standard real-time operating system (RTOS), or a custom run-time environment. For the most part, the firmware will perform low-level manipulations of the hardware in the storage subsystem. In the extreme, the firmware could provide fairly high-level functionality, such as a web-server to provide external (out-of-band) access to the subsystem via an Ethernet connection. However, the fact that it must execute on a low-cost/performance microcontroller requires that this code be written differently from that of a similar host-based version.

Microcode is a special type of code that executes on a SteelVine component to implement the functionality of the SSoC itself. The SteelVine component consists of a silicon component (i.e., Polaris) and a microcode component. The microcode is intimately involved in the operation of the SSoC and therefore requires in-depth knowledge of the deepest details of the chip itself. It executes in a highly resource-constrained and performance-sensitive environment. It involves a high degree of concurrency and requires that special coding considerations be observed to meet all of the constraints. Some form of custom execution environment is often provided for this code, as standard RTOSs generally cannot be used here.

Inter-Switch Link (ISL) Interconnection Fabric

Advanced storage devices that are connected together (i.e. cascaded), whether in a tree or mesh topology, may determine that they are interconnected to similar advanced storage devices. This determination can be made based on the use of specific ports, switch settings, protocol signals, etc. Once this determination is made, the components may utilize communications methods other than the standard disk interface protocols (e.g., SATA). One such communications method is the Inter Switch Link (ISL) protocol. In one embodiment of the ISL, when more than one path exists between a sending and receiving device, the advanced storage devices implementing ISL will route messages through a mesh using the most efficient path. The ISL protocol provides efficient message-based communication within an arbitrary interconnection topology. Within an ISL network, each advanced storage device is considered a node of the network, and is given a unique node ID. The ISL breaks each message into small units, called flow-control units (or flits), that carry the information from node to node. Each flit as sent in one unit, but subsequent flits for a message may be held up due to congestion in the receiving node. Each ISL link is full-duplex, and each direction is logically divided into two or more virtual channels (VCs). All the flits of a message will use a single VC of any given link. While a message on one VC is blocked due to flow control, a different message may proceed over the link using another VC. In one embodiment, one of the VCs is reserved for short messages. At initialization time and when nodes are added or removed from the network, the ISL nodes exchange "flood routing" messages. These messages contain the originating node's ID, and the number of "hops" (or intervening) nodes that the message has traversed. By storing the link on which the message arrived with the smallest hop count for each other node, a node can determine the best output link for sending messages to each other node in the network. This information is stored in the route table. Later flood routing messages from a given node that contain a worse hop count than is already known are discarded and not forwarded. This ensures that the routing process terminates quickly. If the distance to another node (i.e., the hop count) is the same on more than one link, messages can be sent on any of the links. This is used to implement load sharing among the links. The first flit of each message contains the node number of the desired destination node. As the first flit of a message arrives at a node, it is examined to determine the desired destination for the message. If the destination is the receiving node, the message (consisting of the first flit and one or more subsequent ones on the same VC on the same link), is accepted by the node, and is directed to the virtual drive designated in the message. Otherwise, the route table is consulted to determine the best output link for forwarding the message to the destination node. If more than one link is usable, preference is given to an unused one over a used one, or a less recently used one over a more recently used one.

Balanced Scalable Component Design

A balanced subsystem is defined as one which is provisioned in such a manner as to ensure that no single resource stands out as the "bottleneck" during typical usage. A major challenge addressed by the SteelVine Architecture is to allow the creation of a wide range of subsystem sizes by using a single component and maintaining balance. The generalized abstract model for the SteelVine SSoCs has an undefined number of ports for the different types of links (e.g., Host SATA, Drive SATA, and ISL). However, the choice of specific number of each type of link is an important issue in the design of a SteelVine component. In addition to the choice of number of each type of port, the amount of resources dedicated to the implementation of the SteelVine functionality (e.g., virtualization, enhancement, etc.) is a major determinant of cost and performance of the resulting SSoC. The SteelVine architecture was defined to allow the number of host and drive connections to be (independently) scaled across a wide range, with only a small number (ideally, one) of component types.

In order to support a high degree of scalability with a single, low-cost, component, it is necessary to create an atomic unit that can be composed into larger subsystems. This atomic unit serves as a common building block for the creation of storage switches with a wide range of different numbers of Host- and Drive-Ports. This approach is superior to alternatives that either incur extra costs for switches that have unused ports, or incur separate NRE charges for each instance of a different size switch. Furthermore, a properly defined building block unit will contain the least amount of resources required to perform all of the basic levels of functionality for a minimal subsystem, while including sufficient resources to ensure that the resulting subsystem remains in balance (i.e., no bottlenecks occur due to insufficient quantities of any given resource type) as more units are combined to create increasingly large subsystems.

Scalability is achieved through a fabric and balance is achieved through a combination of the definition of resources included in the atomic building block and the topology in which these blocks are combined. The dimensionality of a hypercube defines the degree of scalability possible. With a flexible routing fabric, the interconnection topology can be arbitrary, some will be better than others. Latency and Bandwidth are the main issues around switch scalability. Hop count defines latency. Bandwidth is defined by dimensionality and topology. An N-dimensional hypercube is the ideal topology because it minimizes average hop length and provides uniform bisectional bandwidth (i.e., get equivalent aggregate bandwidth regardless of where you bisect the fabric). Dimensionality of the hypercube is defined by the number of ISL ports. In the worst case, all hosts try to access drives that are the most remote from the host's node, such that each node has to support both through traffic, as well as traffic coming from it's local host (going to remote nodes), and from the local drives (going to remote nodes/hosts).

To achieve high degrees of scalability, and to optimize their price/performance characteristics, SteelVine components are constructed with a "balanced" number of Host, Drive, and Inter-Switch Links, and related resources. A balanced component design is defined here to be one where a single chip has sufficient (bandwidth and computation) resources to support the host/drive interactions, and when additional chips are added each additional chip provides the resources needed to ensure that the entire subsystem remains balanced.

Separation of Policy and Mechanism

In the design of such systems, it is frequently a good design practice to separate policy (i.e., what should. be done) from mechanism (i.e., how it is to be done). The SteelVine SSoCs have been designed with these principles in mind, yielding several different design options, the main types of which are described below.

Figure 7:
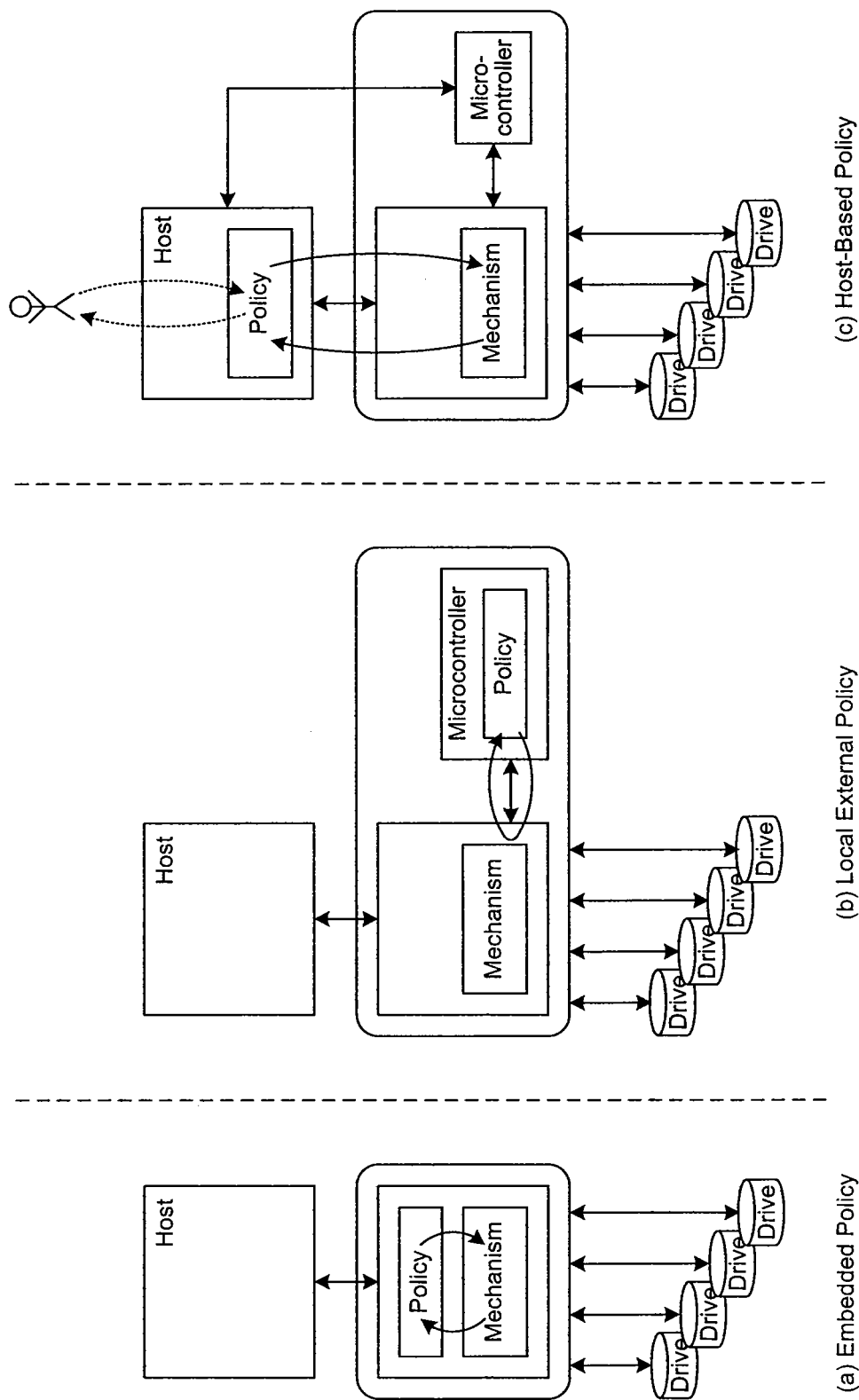
FIG. 7 illustrates the separation of policy and mechanism in one embodiment.

In the SteelVine-based products, the primary function of the microcode is to implement the mechanisms that provide the basic functionality SSoC (i.e., SATA PM functionality, with the addition of virtualization and RAID features), along with a set of other low-level mechanisms (e.g., disk-to-disk copy, external communications, remote access, etc.). This code performs all of the "steady-state" operations required of the subsystem. However, when some "exception" event occurs (e.g., drive failure, new drive coming on-line, drive going off-line, etc.), a decision must be made as to how to respond to this event. The "policy" component is defined to be the logic that handles these events and determines the appropriate action to be taken in response to each of them. This logic is realized in code known as the Policy Module, which can be implemented in several different locations (as shown in FIG. 7).

Embedded Policy

In the first example option (i.e., FIG. 7a), the Policy Module is embedded within the SSoC itself. When policy events occur, the Policy Module is invoked and the chip decides for itself what needs to be done, without consulting any outside entity. The only external input to the policy decision-making process comes from strapping options delivered by way of General Purpose Input pins on the chip. Based on the settings of these strapping option pins, different behaviors can be elicited from the same policy module, or alternatively, entirely different embedded policies can be selected.

The policy logic is separated from the mechanisms in the SSoC's microcode, and there exists a well-defined interface between the Policy Module and the core mechanisms. Arbitrary Policy Modules can be loaded into the SSoC (as long as the chip's code- and data-space permits). The execution of the Policy Module is typically not time-critical, so performance concerns are minimal (and the Policy Module should be executed at an appropriately lowered priority level within the SSoC).

Because this type of embedded policy can rely only on fairly static information upon which to base its decisions on how to react to different events, it can only be used to implement fairly simple policies. Performance constraints, as well as code and data size limitations, will prohibit the implementation of policies that require extensive complex computations. The persistent state information related to the policy in effect is stored in the SSoC's EEPROM, which may have very limited space.

The use of embedded policies is best restricted to only the most simple and universal policies, for the most cost-sensitive applications. This is because even though the Policy Modules are modularized for easy addition and removal, the SSoC must be completely revalidated each time a policy module is changed (as it represents different microcode). Furthermore, any policy that would require consulting an external entity or user, while possible, would likely not be implemented in an embedded form.

Local External Policy

The second option for implementing Policy Modules is illustrated in FIG. 7b, where the Policy Module is implemented in a microcontroller, external (but local) to the SSoC itself. More complex policies can be implemented with more relaxed (although still not totally un-constrained) resource restrictions. Since very low-cost single-chip microcontrollers (e.g., PIC) exist, the additional cost of this approach can be very low. This approach allows the production and validation of a policy-free (i.e., pure mechanism) SSoC, where customized policies can be added through the addition of a small component (equivalent to an I2C-based EEPROM). Alternatively, a more highly functional microcontroller could be used, which could also provide support for an external (out-of-band) interface to the storage subsystem—e.g., an Ethernet, USB, or RS232 link, a Compact Flash or PCMCIA card interface, an ISO7816 smart card interface, or an 802.* or Bluetooth wireless link.

The selection or configuration of a policy can be done by an external interface. This approach has the additional benefit of allowing state information associated with the Policy Module to be stored external to the storage subsystem. An external processor (especially one with an external communications link or solid-state memory device interface) can provide a means of backing up critical state to an "off-site/remote" location. This prevents the drives from becoming inaccessible if the Policy Processor is replaced.

The external policy controller is configured in such a way as to be able to handle all possible events without user intervention—i.e., do the right thing without asking a user for input. This means that for many events, a simplistic, brute-force or worst-case type of action must be taken. For example, the question of what should be done when a new drive appears in the system must be answered with a simple response that works correctly regardless of the situation—e.g., always distribute the new drive in a deterministic manner to pre-defined logical drives, assign the new drive to a "free pool" and await user-directed configuration, etc.

Host-Based Policy

Finally, the option shown in FIG. 7c represents the case where the Policy Module is implemented on the host. Arbitrarily complex (and stateful) policies can be implemented with this approach, as well as policies that require human interaction.

It is possible for this option to be equivalent to the Local External Policy example defined above, where .the host executes the policy module instead of a local microcontroller. In this case, the host-based Policy Module might be referred to as a "daemon" process—i.e., an application that runs on the Host without any user-visible representation. The host might substitute for the Policy Processor in the Local External Policy case, and run the same policy computations as a host daemon. A daemon can be set up on the host and run silently, responding to events from the storage subsystem and sending updates to the SSoC's state. It is possible to have entirely pre-defined Policy Modules that run on the host as a daemon without any user input, or Policy Modules that are configured and driven from a user-defined configuration file, a CLI, or a GUI.

There are many circumstances when a user should be consulted in order to determine the proper action to take in response to an event from the Storage Subsystem. In addition to the daemon approach described above (which does not involve any interaction with users in steady-state operation), it is possible to have policies that involve a user in the policy decision-making process. Both CLI- and GUI-based applications can be created to make man-in-the-loop Policy Modules. These applications handle events from the storage subsystem, generate interactions with a user (e.g., via pop-up windows), and update the state of the storage subsystem.

The interactions between storage subsystems and their host-based Policy Modules can be performed by way of in-band (i.e., using the SATA link) or out-of-band (i.e., using some ancillary connection such as Ethernet, USB, RS232, WiFi, Bluetooth, etc.) communications links. The protocol used to communicate with external Policy Modules and the use of in-versus out-of-band communications links will be discussed in greater detail in following sections.

Policy Implementation Choices

Regardless of which of the above options is used to implement the policies, the interface between the SteelVine SSoC mechanisms and its Policy Modules remains logically the same. Events (that are typically related to the coming and going of drives) generated by the SSoC's mechanisms go to the Policy Module. The Policy Module then executes some logic to determine which Actions (that typically involve updating the SSoC's virtualization tables) should be performed in response. These are applied to the SteelVine SSoC using an update mechanism.

It is also worth noting that, in addition to the three options described above, a variety of hybrid cases also exist for implementing Policy Modules for SteelVine-based storage systems. For example, a non-local microcontroller that is not the host could be used. There might be multiple hosts in a larger system containing SteelVine storage, and a single host might be assumed to perform the policy functions for each of the SSoCs in the greater system.

Each of the options defined above (and the various hybrid choices) has distinct benefits, costs, capabilities, and limitations. The first option (Embedded Policy) has the benefit of the simplicity and low cost associated with a single-chip solution. While it is possible to implement many useful policies with this approach, it is the most limited of the options. The second option (Local External Policy), offers a wide range of capabilities, at a commensurately large range of different costs—from little more than the single-chip approach, to little less than the host-based approach. The fact that external Policy Modules can be "piggy-backed" onto microcontrollers that are used for other functions (e.g., enclosure management and external interface processors), makes this approach a desirable option. While the third option (Host-Based Policy) might be thought of as the most cost-effective (taking advantage of the resources that already exist within the host), this option has significant disadvantages. Host-based policy solutions run counter to the objective of creating storage subsystems that appear as simple-to-use appliances that work with any host and require no user intervention to perform their defined functions. The host-based approach requires installing software on the host, which must be created and validated for use with many versions of OSs. This approach also consumes host resources which tend to be much more expensive per unit than small embedded controllers. Furthermore, if the replacement of a host results in the loss of policy/configuration information, access to data might be compromised.

Features of the SteelVine SSOC

There can be many different realizations of the SteelVine Architecture, but the components that lie at the heart of the architecture all share a set of common characteristics and draw on a common set of features. The general feature set for the entire SteelVine family of SSoCs is defined in this section, and the subset of features embodied by specific implementations (based on the Polaris and Milkyway hardware) is described in following sections.

From the Host's perspective, a SteelVine component appears to be either a physical drive, or a set of set of physical drives behind a standard Port Multiplier. These drives being presented to the host are not (necessarily) actual physical drives, but are, in fact, Virtual Drives. They appear to the host as drives with additional (beneficial) properties (e.g., size, speed, and reliability) that can be different from those of the physical drives from which they are created. A SteelVine component's main function is to create and maintain Virtual Drives based on its set of available physical drives, following a well-defined set of rules, along with some (either static or dynamically alterable) configuration data.

A host should not (in principle) be able to detect that the Virtual Drives being presented to it are not actually physical drives (with the defined additional properties). This illusion may be put aside for various practical purposes, but otherwise, for all intents and purposes, the Virtual Drives created by a SteelVine SSoC are indistinguishable from physical ones. Likewise, in an extreme degenerate case, a SteelVine component can be configured so as to provide functionality that is identical to that of a standard, dumb, SATA Port Multiplier.

The abstraction of a Virtual Drive is created by performing transformations on the host-generated SATA command stream. These transformations can be implemented in large part by simple table-lookup operations, where commands directed to Virtual Drives (i.e., Virtual Commands) can be quickly and easily transformed into (possibly multiple) commands on one or more physical drives (i.e., Physical Commands). In some cases, the transformation can be done simply by substitution of values in the command (e.g., target drive and starting sector). Other cases require that multiple Physical Commands be generated in response to a single Virtual Command—e.g., to span concatenated physical drives, to replicate writes for mirrored sets, etc. In the former case, a simple table-lookup function can be used to perform the transformation from Virtual to Physical Commands. In the latter case, there must be some additional logic executed in order to perform the required fork/join-type operations and to handle various exception conditions (e.g., drive failures, command retries, etc.).

Figure 8:
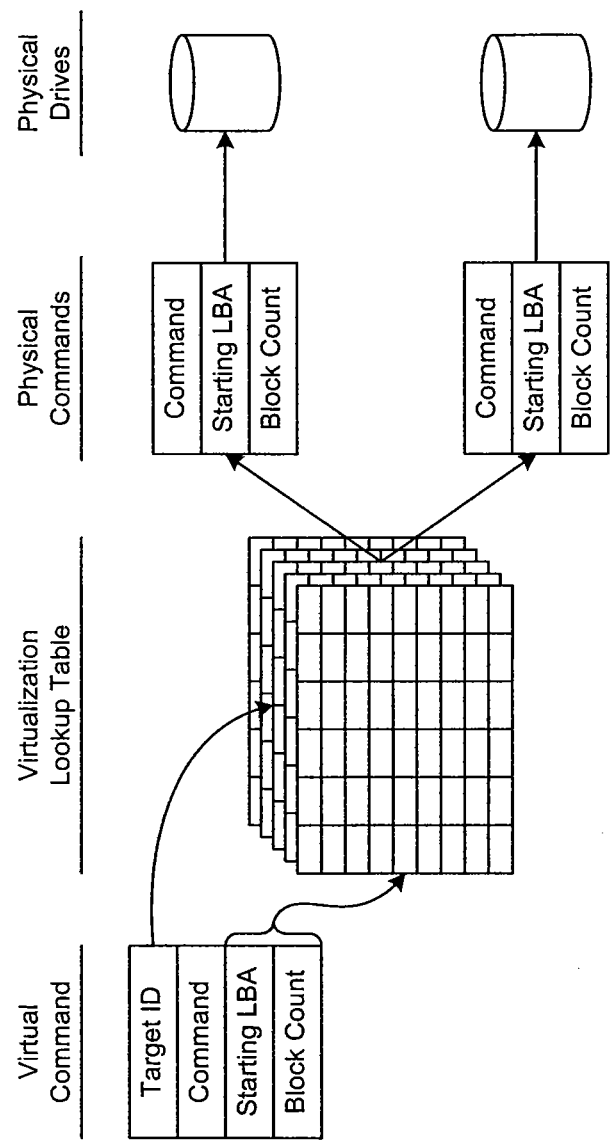
FIG. 8 illustrates the transformation of virtual commands to physical commands in one embodiment.

The support of multiple Virtual Drives is accomplished by taking advantage of the addressing mechanism provided by the Port Multiplier specification. From a very high level view, the SATA commands issued by a Host consist of packets that define the type of operation to be performed, plus the arguments necessary to perform the given operation. While many different types of commands exist, the key ones of interest are the ones that perform read or write operations on a series of disk blocks (also known as Sectors). A typical read operation has as arguments the starting block address (typically, a 48-bit value known as a Logical Block Address (LBA)) and the number of blocks to be read. The host sends this command to a drive and the desired data blocks (from the given location on the disk) are returned. Similarly, a write operation has the same address and count arguments, but also includes the data blocks to be written to the (given location on the) disk. In addition to this, the SATA Port Multiplier specification allows for an additional argument to be included that chooses which one of up to 14 different physical drives is to be the target of the given command. To create Virtual Drives, the SteelVine component uses the target drive number to select the transformation information that defines a given Virtual Drive, and based on this information, generates one or more Physical Commands that have the appropriate Physical LBA and number of blocks. The read/write data is not modified as a part of these transformations. An example of this virtual-to-physical command transformation is shown in FIG. 8. The Target ID selects which table to use, and the Starting LBA and Block Count arguments define which table entries are to be used to virtualize a particular command.

Combining SteelVine Components

The SteelVine architecture provides the ability to "cascade" SteelVine devices to allow access to a large numbers of physical devices from a single Host Port.

The SATA II Port Multiplier specification provides four bits of target addressing, which allows access to up to 15 physical disk drives. The specification explicitly states that Port Multipliers cannot be cascaded. The rationale for this restriction is that there is no mechanism for extending the disk addressing to lower layers of devices. However, the virtualization capability of SteelVine can be used to overcome this limitation. For example, a host could be connected to a simple Port Multiplier (which is implemented according to the SATA II specification), where each Drive Port on the Port Multiplier is connected to a SteelVine device that implements a single Virtual Disk. Below the SteelVine device can be several physical drives that are virtualized (e.g., concatenated, striped, etc.) to present a single Virtual Drive to the Port Multiplier. In this way, the single-level limitation of the Port Multiplier specification is overcome.

Note that the SteelVine devices in the lower levels in the example above could, instead, be connected to additional SteelVine devices which, in turn, Virtualize several more physical drives, again presenting a single Virtual Drive to the device above. In a sense, the upper SteelVine device is creating a new Virtual Drive that is composed of the other Virtual Drives presented by the lower SteelVine devices. It is clear that there is effectively no limit to the number of layers of SteelVine devices that can be cascaded in this manner. Note that, for hosts that cannot communicate with simple Port Multipliers (i.e., are not Port Multiplier aware), the top-level device could instead be a SteelVine device providing a view of a single Virtual Drive to the connected host—i.e., a top-level simple Port Multiplier can be used, but is not required in this scenario.

Since each layer of SteelVine devices exponentially increases the number of physical drives that can be accessed, there is effectively no limit to the number of physical drives that can be attached to a host. However, there are practical limits on the usable cascading depths. For example, each layer would be expected to reduce overall performance slightly due to the additional latency introduced.

When a set of physical drives is virtualized, the essence of the transformation performed is that a portion of the Logical Block Address (LBA) sent in commands to a Virtual Drive is used to select the lower or constituent drive where the data begins (either on a physical or cascaded virtual drive), and the remainder of the LBA is used to select a location within the component device. That is, virtualization allows part of the LBA to provide additional bits for disk addressing. This is, how cascading overcomes the four-bit address limit inherent in the SATA II Port Multiplier specification.

Logical Layers of Functionality

Figure 9:
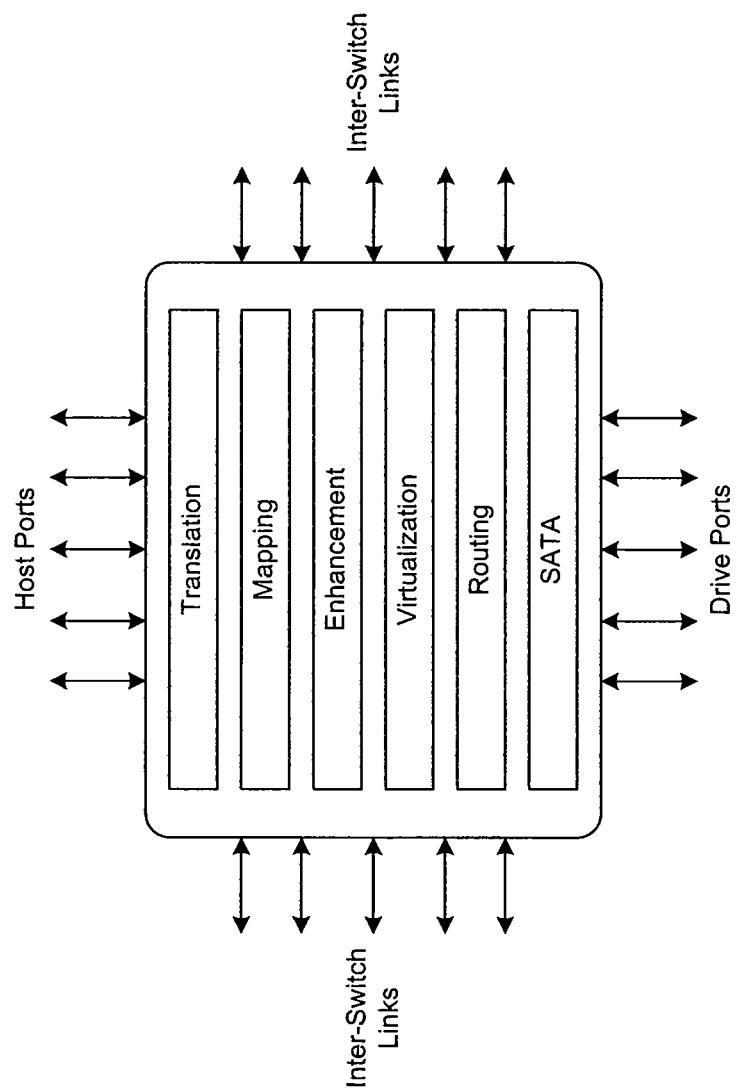
FIG. 9 illustrates the logical layers of the SteelVine component in one embodiment.

The SteelVine architecture provides considerable functionality in addition to the creation of Virtual Drives from a set of Physical Drives. The features needed to produce the enhanced Virtual Drive functionality (e.g., improved speed and reliability), and those needed to allow for scaling the number of drives and hosts beyond that provided by a single SSoC, are provided in addition to the basic SATA Port-Multiplier-like functionality and the simple virtualization defined above. FIG. 9 illustrates the canonical SteelVine SSoC, whose external interface consists of some number of high-speed ports connecting to (one or more) hosts, several drives, and potentially other such SSoCs (in order to allow for scaling beyond the number of hosts and drives supported by a single chip).

The complete set of features in the SteelVine Architecture is defined below as a set of logically independent layers. The logical layers of functionality shown in FIG. 9 appear in an organization that suggests both the uses hierarchy for the functions, as well as the relative levels of abstraction at which each function exists. (These layers do not necessarily have to be implemented as separate functions, and furthermore, not all of these features must be present in a particular product.)

The subsections below describe the different logical functions of the canonical SteelVine component. These functions include: the mechanisms required to support SATA drives; the features that enable access to a large number of remote drives (via a fabric made of a collection of SteelVine components); the logic for basic virtual-to-physical transformations (i.e., creating Virtual Drives out of regions of Physical ones); mechanisms that provide the additional enhancement of the characteristics of Virtual Drives (e.g., speed or reliability); mechanisms for mapping Virtual Drives to specific Target IDs (for a given host); and the features that allow the transformation of the SATA protocol into other (potentially higher-level) ones.

SATA Layer

In some embodiments, the SteelVine SSoC's primary external interface connections (i.e., the Host- and Drive-Ports) are all SATA interfaces, and for this reason the first logical layer in the SteelVine component architecture involves supporting the SATA interface. In addition to the basic capabilities defined by the SATA Physical, Link and Transport layers of the SATA I specification, this layer provides support for the Native Command Queuing (NCQ) protocol defined in the SATA II specification, as well as the features defined in the SATA Port Multiplier specification.

There are two types of SATA interfaces on SteelVine components—Target (i.e., Host) Ports and Initiator (i.e., Drive) Ports. As described earlier, the SteelVine Architecture strives to achieve balance in choosing the number of each type of link to be included in a component. Beyond this, there is no further differentiation between the SATA ports in a SteelVine SSoC; each of the types SATA ports should be equivalently functional, and there should be no specialization or differentiation between individual instances of a particular type of port. In particular, even though the SATA Port Multiplier specification calls for special treatment of Physical Drive Port 0 (in order to support legacy boot operations), there should be no difference between the Physical Drive Ports on a SteelVine component. This is necessary because the virtualization and mapping functions (described below) allow any Physical Drive(s) to be used to create Virtual Drive 0.

Physical, Link and Transport Sub-Layers

The hardware/software implementation tradeoffs made for SteelVine components are influenced heavily by the principles of good policy/mechanism separation. These guidelines suggest an approach where data packets are controlled by software executing on some sort of processor, but the data itself flows through specialized hardware. This approach separates the data plane (i.e., the high-performance, low-level, data-moving mechanisms), from the control plane (i.e., the higher-level, control-oriented logic, with longer-time-constants, and hence less stringent performance constraints). The hardware/software tradeoff approach taken here suggests that hardware mechanisms should be provided to implement all of the standardized features of the SATA Physical, Link and Transport layers.

This means that, to the greatest extent possible, the hardware mechanisms implement the logic (i.e., state-machines) defined in the SATA specifications to allow the Host- and Drive-Ports to function in the standard manner. However, there should be "hooks" to allow different policies to be applied to these mechanisms. It should be possible for the various SATA ports to automatically generate the appropriate response to various standard SATA events (e.g., initialization, idle, power-management, arbitration, etc.), but at the same time microcode-defined, soft policy logic detects, responds to, and generates events in a manner consistent with the given policy. For example, while it is appropriate for the hardware to provide mechanisms that automatically detect CRC errors in SATA packets (i.e., FISs), it should be up to the policy portion of the implementation to determine what action should be taken in response to such an event—e.g., send an error primitive immediately, log the event and pass the FIS on, etc.

This does not mean that the mechanisms should be designed at such a low level of abstraction that they simply generate a signal each time an event occurs, and leave it up to the software to handle it. Instead, a proper hardware/software tradeoff allows the software to select certain pre-defined (standard) behaviors for the common policy cases, and to escape into software-defined logic for the non-standard cases—i.e., when a policy is to be implemented that does not conform to the behaviors defined in the SATA specifications. Good mechanism design will not confine the policy choices to only those known a priori, but will allow a wide range of different behaviors to be constructed out of a set of functional building blocks. The goal of such a design approach is to elevate the level of abstraction of the defined mechanisms to the highest possible level, without encroaching on policy decisions—i.e., try to embody as much of the functionality of a feature as possible in hardware up until the point at which the hardware would restrict the range of uses of the mechanisms.

In keeping with these design principles, it is wholly appropriate for the demultiplexing of incoming FISs to be handled in hardware mechanisms—e.g., to separate out FISs that are directed to Virtual Drives, from those being sent to the Port Multiplier Control Port, or the Storage Enclosure Management Bridge. Similarly, it is appropriate that low-level link functions (e.g., auto-negotiation of link speed, idle generation, link arbitration, power-management) should be handled in hardware, with the ability for software to override "standard" behavior—e.g., allow the link speed to be forced to a given rate, regardless of what the outcome of the auto-negotiation phase might have been. It is also appropriate for hardware mechanisms to implement the shadow registers and supporting logic for the Drive Ports.

An example of where the SATA mechanisms allow different policies to be applied is in how link-level acknowledgements are handled. While the SATA Port Multiplier specification states that link-level acknowledgements must be done by the drive and passed through the PM transparently, a performance optimization can be achieved through the speculative acknowledgement of host packets (with good CRCs). This optimization can be applied in certain situations and it is up to the policy logic to determine when it is appropriate to do so, and when it should not be done.

Another example involves the policy applied to the queuing or buffering of packets between the host and drives. Given that the host link may be capable of running at higher rates than the drives can support, the Host Link utilization could suffer if a direct connection is made between the drive and the host. The Host Link might operate at an effective rate of 1.5 Gbps instead of the 3 Gbps it is capable of. An alternative approach that would improve host link utilization (which can be a critical, performance-limiting, metric within a SteelVine-based system), would involve the buffering of FISs from the drives and then sending them, full-speed, to the host. While this technique would increase host link throughput in some situations (i.e., when there is more than one drive being accessed over the same host link), it does so at the cost of increased latency (which causes throughput to suffer when accessing only a single drive). Therefore, it becomes a policy decision when (or if) buffering should be done. The underlying hardware mechanisms support whatever choice is made by a policy module at a given point in time.

Port Multiplier

The SATA II Port Multiplier (PM) Specification defines a simple addressing scheme that allows more than one Target Device to be attached to a single Initiator's link. This is intended to allow multiple drives to be attached to a single Host Port, and is reasonable given the SATA II bandwidth of 3 Gbps and the bandwidth of current (volume) drives (whose read-head channels provide considerably less than 700 Mbps of sustained bandwidth).

The PM specification defines four reserved bits in the FIS header for addresses (known as Target IDs) that are used to select specific drives in a standard sort of hub or multiplexer configuration. The Target ID field is used to select one of up to 16 different targets. A PM is defined as having a single Host Port, and up to 14 Drive Ports—which are (contiguously) numbered from 0 up to N−1, where N is the total number of ports offered by the PM instance. Target ID 0 Is special in that it is used to implement legacy compatibility. This means that a drive connected to Port 0 will spin up and be bootable even if the Host Controller is not PM-aware (i.e., it is not aware of, or able to select Target IDs in the FIS Header). Target ID 15 is defined to be the port that is used to talk with the PM itself. This port offers access to a set of (standard- as well as vender-defined) registers that can be addressed and read/written as 32-bit values.

One more Target ID can be set aside for use as the address for the Storage Enclosure Management Bridge (SEMB) function. This address is typically one greater than the address of the maximum number of physical drives supported by a PM (i.e., Target ID N+1). This function acts as a bridge, transparently forwarding commands and responses between the host and a Storage Enclosure Processor (SEP) attached to the PM.

SATA Host Controllers can be either PM-aware (which means they can generate and respond to non-zero Target ID fields in FIS Headers), or non-PM-aware (which means they put zeros into, and otherwise ignore, the FIS Target ID fields). SATA Host Controllers can also support Command-Based Switching, or FIS-Based Switching. Command-Based Switching involves the issuing of only a single command to a given Target Device at a time. Only after that command has completed can the Host issue a new command to another target. While this approach is less expensive (because it is simpler and requires fewer resources to implement), it limits the amount of concurrency that can be achieved, and hence the performance of the storage subsystem. With FIS-based switching, the Host can have multiple outstanding commands to different targets, and cope with the fact that a response FIS might come from any of the targets that have commands outstanding on them. This is done by maintaining separate contexts for each outstanding command, and associating responses with the appropriate context (by way of a "tagging" mechanism). This approach yields higher system performance at the price of additional hardware costs and complexity in the Host Controller. Whether a Host Controller implements Command- or FIS-Based Switching is largely transparent to a PM-compliant device. The concepts of contexts and tagging are described in further detail in the section on NCQ below.

It should be noted that the SteelVine components use the PM spec's addressing feature to select virtual drives. SteelVine components may also make use of the (Target ID 15) vendor-defined registers, as well as the SEMB function. These PM features are used to keep with the letter (if not the spirit) of the PM specification, and to provide support for the unique features of the SteelVine SSoCs.

Native Command Queuing (NCQ)

Another feature of the SATA specification that can have a significant impact on the performance of any SATA-based system is known as Native Command Queuing (NCQ). This feature is found in other storage interfaces (e.g., SCSI), and involves allowing multiple commands to be outstanding on a given drive at a time. This means that command execution by drives need not be strictly synchronous; a host can issue additional commands to a drive before all previously issued commands have been completed. NCQ implies that commands can be executed by a drive in a different order than the order in which they were received at the drive. The benefits of NCQ are many-fold, and include increased performance by overlapping command issue and command response, thereby allowing latencies to be hidden (resulting in increasing the overall throughput of a busy storage subsystem). Additionally, the fact that the drives may now have access to more than one command at a time means that they can do more efficient disk-head scheduling, based on increased knowledge of the current rotational position of the platter relative to the requested seek operations.

It can be very resource-intensive to support NCQ as it calls for the creation of multiple "contexts," both at the Host and Target ends of the wire (as well as anything in between). Each context holds the state of an outstanding transaction (which might include a copy of the outstanding FIS, DMA state, error state, etc.). For this reason, neither host controllers nor drives that support the SATA NCQ protocol are widely available, and when NCQ does become available it will (at least, initially) come as an added-cost feature in a subset of available SATA HBAs and drives. Nonetheless, it is possible to make use of this protocol to increase the performance provided by SteelVine-based Storage Subsystems. SteelVine devices permit the host to have multiple outstanding commands on the same target device, even if the Physical Drives do not provide support for the NCQ protocol. This improves performance by supporting pipelining of operations, which allows latency to be hidden by overlapping command issuing and execution.

The NCQ protocol allows up to 31 outstanding commands to be issued per Target device. A Port Multiplier allows there to be up to 14 Targets per HBA Port. Therefore, it is possible for an SATA Host Controller to have up to (14*31=) 434 outstanding commands per Host Port. This represents a (prohibitively) large number of contexts per Host Controller. The SteelVine SSoC would likewise have to support an excessively large number of contexts if it were to support this maximum number of outstanding commands. Fortunately, simulations have shown there are diminishing returns in response to supporting more than four outstanding commands per target, and the NCQ protocol allows for there to be fewer than the maximum number of outstanding commands in progress.

The SteelVine SSoCs can provide some fixed number of outstanding commands per Virtual Drive they export, and this number can be considerably less than the maximum specified limit of 434. In fact, the SSoC can support a dynamically variable number of outstanding commands per Virtual Drive. This can be done by allocating contexts from the common pool as each queued command arrives at the SSoC, returning to the host a FIS with the busy bit (BSY) cleared until there are no free contexts. At this point, the SteelVine component can simply wait until a context becomes free before clearing the BSY bit for the waiting Virtual Drives. Since an independent ATA Register Set exists at the HBA for each Target ID (hence, for each Virtual Drive), this activity has the effect of 'flow-controlling" the rate of command issue independently for each Virtual Drive.

It should be noted that the NCQ protocol is independent of support for PM (although both features are supported in the SteelVine Architecture), and NCQ can be used with either PM-aware or non-PM-aware Host Controllers.

Virtualization Layer

The Virtualization Layer is responsible for creating Virtual Drives out of one or more (local or remote) physical drives. Virtualization may consist simply of defining a Virtual Drive as a (possibly, proper) subset of the blocks on a physical drive. In this case, all that is required is to translate LBAs from the Virtual Drive's address space to the proper addresses on the physical drive. Virtualization also allows the creation of a Virtual Drive made up of contiguous blocks from multiple physical drives. In this case, a given Virtual Command could define an operation that affects multiple physical drives (i.e., a read/write operation that spans the boundary between two physical drives), and thus, multiple Physical Commands must be generated. The Virtualization Layer is responsible for splitting Virtual Commands into the proper number of Physical Commands (each with the proper field values), as well as combining the results from these Physical Commands into a combined virtual response.

In some embodiments, the virtualization layer is implemented using a combination of a Lookup Table (LUT), and a set of state machines. In such an implementation, the LUT is responsible for translating the Virtual Command's Starting LBA and Block Count fields into their physical values, and potentially generating the fields for multiple Physical Commands. The state machines are responsible for performing the forking/joining of multiple Physical Commands into a single virtual response, and the handling of any exception conditions that might arise from these operations. Just as multiple physical responses are combined into the virtual response returned to the host in response to a Virtual Command, the exceptions that result from the issue of multiple Physical Commands are combined into a virtualized exception (and potentially suppressed) before being delivered to the host.

The Starting LBA and Block count fields of read/write Virtual Commands are decomposed into one or more sections, and then translated to map them into the appropriate portions-of given Physical Drives. However, regardless of the number of Physical Commands that result from this act of virtualization, one invariant is always maintained—the sum of all of the Physical Commands' Block Count fields equals that of the Virtual Command's Block Count field. The Virtualization Layer translates addresses, and sometimes issues them as multiple sub-references, but generates exactly as much read/write data as requested by the Host.

The basic unit that the Virtualization Layer operates on is a contiguous range of disk blocks, referred to here as a Region. One or more Physical Drive Regions can be combined by this layer to create a Virtual Drive. In this document, the combination of Regions from multiple drives is known as Concatenation or RAID –1 (i.e., a feature of independent/inexpensive disk arrays, having even less to do with redundancy than striping (RAID 0)). The concept of Regions and their use in Concatenation are both described in the following subsections.

Regions of Physical Disks

In this document, a Region is defined as a contiguous range of blocks (ranging in number from one to all) of a single Physical Drive. It is possible to define overlapping Regions, and a single Region can be defined to include an entire drive, but a Region cannot span multiple Physical Drives.

Figure 10:
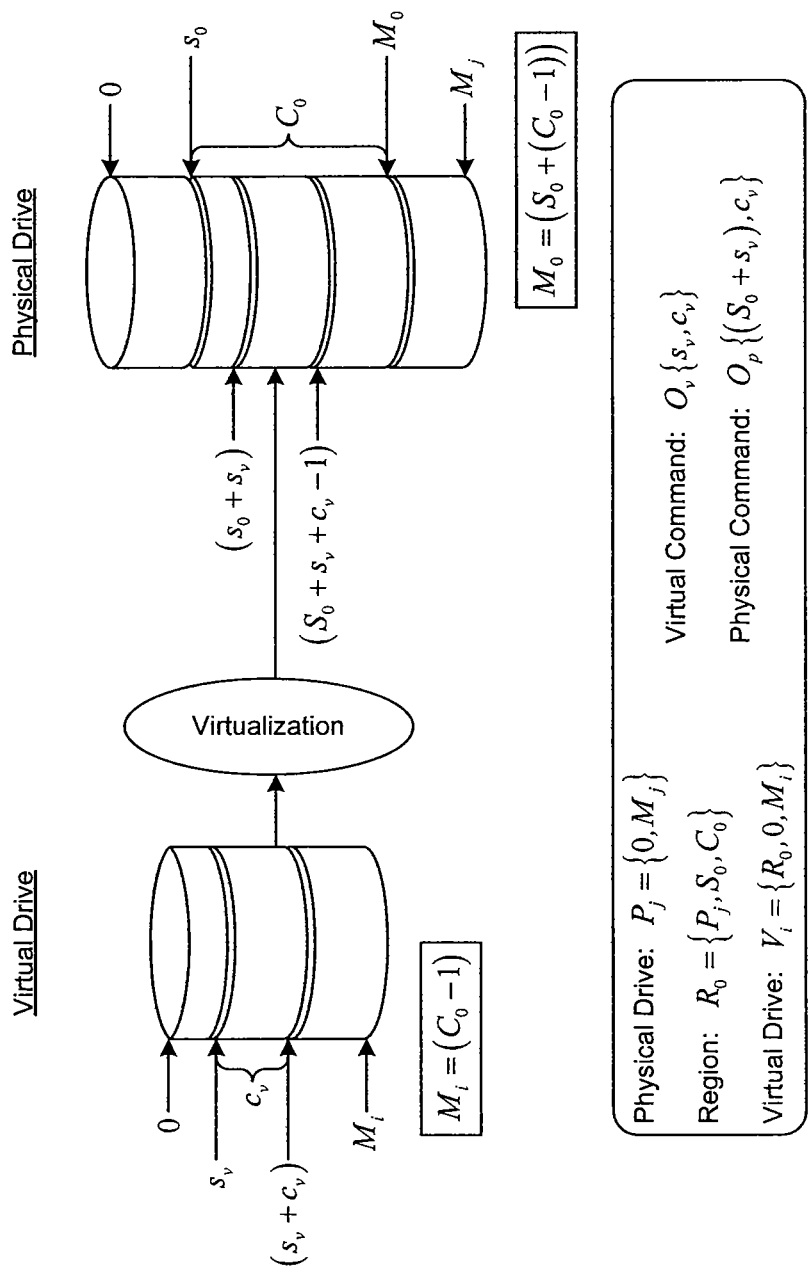
FIG. 10 illustrates transforming a physical disk region into a virtual drive in one embodiment.

In FIG. 10, a Virtual Drive (V) is created from a single Region consisting of a fraction of a single Physical Drive. The illustrated Physical Drive ($P_j$) has a block address space that ranges from 0 (the first block on the drive) to $M_j$ (the LBA of the last block on the drive). The notation used in this illustration represents the Region ($R_0$) as a tuple ($P_j$, $S_0$, $C_0$), which includes the identifier for the Physical Drive on which the Region is defined ($P_j$), as well as the starting block address ($S_0$) and the Block Count ($C_0$) for the Region. The defined Region of the given Physical Disk can be presented to the host as Virtual Drive $V_i$. Such a Virtual Drive is defined by a tuple representing the Region that it is based upon ($R_0$), its starting LBA (0), and its maximum LBA ($M_i$, which in this case is equal to ($C_0-1$)).

In the illustrated example, a read/write access command issued on the Region is illustrated as another tuple, which defines the subset of Region $R_i$ that is affected by the given Virtual Command. This tuple describes a Virtual Command in terms of its Starting LBA ($s_v$) and Block Count ($c_v$). The example also shows the Physical Command that results from the Virtualization, which consists of a tuple that contains the starting (physical) address of the transaction ($S_0+s_v$), and the Block Count ($c_v$). Note that in this simple case, the command type remains the same and the block count field does not change as part of the virtualization process.

This illustrates the Virtualization Layer's most basic purpose-which is, to transform the Virtual Drive's Block address space onto that of a Region. Since a simple linear relationship exists between these two address spaces, this transformation is easily done with a LUT-like implementation, and no additional logic is required. Examples of the application of the Virtualization Layer include: the creation of multiple, smaller, Virtual Drives out of a single larger Physical Drive; the creation of a single, larger Virtual Drive out of multiple smaller Physical Drives; and the creation of a large, faster-than-average, Virtual Drive out of the fast regions of multiple Physical Drives.

Concatenation (RAID –1)

An extension of the Virtualization Layer's Region abstraction is the notion of Concatenation—i.e., the creation of a Virtual Drive that consists of the linear combination of more than one Region. This feature can be used to create a single larger Virtual Drive out of a set of two or more, smaller Regions (from either different, or the same, drives). The simplest use of this feature is to combine multiple complete Physical Drives into a single Virtual Drive with the combined capacity of all of the Physical Drives in the set.

Figure 11:
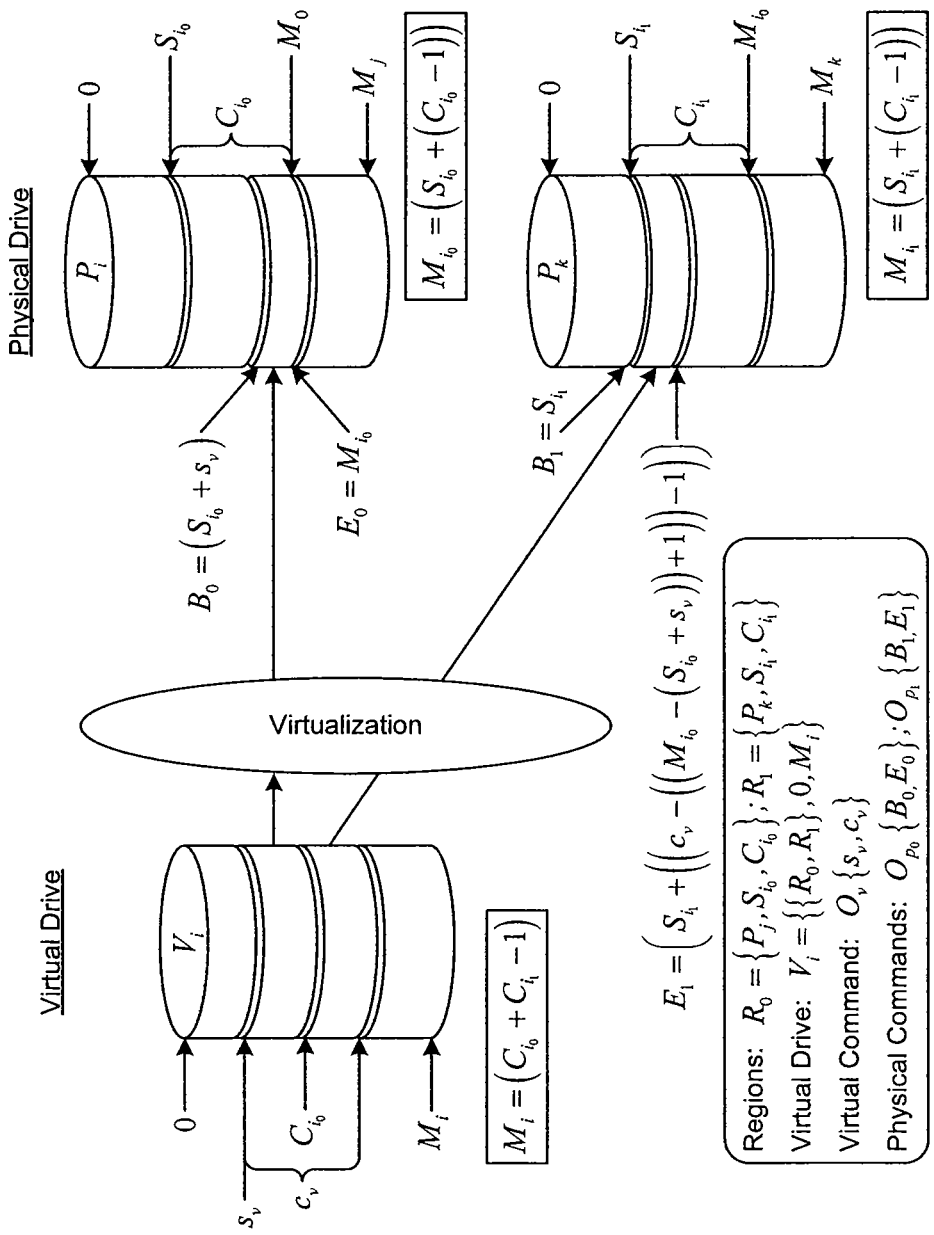
FIG. 11 illustrates creating a virtual drive by concatenating physical disk regions in one embodiment.

FIG. 11 provides an example of concatenating two Regions from different Physical Drives into a single Virtual Drive. In this example, the Virtual Drive ($V_i$) can be represented by a tuple ($L_i, 0, M_i$) that contains the list of Regions that comprise $V_i$, (in the order in which they appear in the virtual address space), the starting Block address (0), and the maximum valid block address ($M_i$, which is equal to the sum of the sizes of the combined regions, minus one—i.e., ($C_{i0}+C_{i1}-1$)).

There are no restrictions on the choice of Regions that can go into creating a concatenated Virtual Drive (other than those that apply to Regions themselves—e.g., non-overlapping, contiguous, groups of blocks, etc.)).

Enhancement Layer

The Virtualization Layer is involved with the creation of Virtual Drives that differ only in size and otherwise share all of the same properties with the Physical Drives from which they are constructed. Building on the basic functionality provided by the Virtualization Layer, the Enhancement Layer starts with sets of (potentially concatenated) Regions, and applies a small set of additional functions to them in order to create Virtual Drives that have enhanced properties over those of their constituent Physical Drives.

The Enhancement layer combines multiple regions in a variety of ways to enhance the performance and reliability of the underlying Physical Drives. While these features are in many ways similar to those found in systems that offer different varieties of RAID functionality, the Enhancement Layer is different in several important ways. The features of this Layer are defined to be functions that can be easily and cheaply integrated into a single, low-cost, SSoC, and still be capable of operating at "wire-speed" (i.e., at a level of performance that is equivalent to that of a direct connection between an HBA and a Drive). This means that the mechanisms provided by this part of the SteelVine Architecture tend to be easy and cheap to implement, and make use of simple, brute-force techniques. For example, simple mirroring (RAID 1) is used instead of Parity RAID (e.g., RAID 5) to enable a simple, low-cost implementation without requiring significant amounts of processing power and memory.

The key features of the Enhancement Layer include striping (RAID 0), mirroring (RAID 1), and combinations of the two (e.g., RAID 10 and RAID 01). These features are layered on top of those defined by the Virtualization Layer and are described in greater detail in the following subsections.

Striping (RAID 0)

If the access pattern is random (e.g., on a server or multi-user system of some sort), then to get the benefit of multiple heads moving concurrently, the stripes should be big enough so that individual read/write transactions do not cross stripe boundaries very often, but not so big that you don't get the statistical benefit of having concurrent seeking. If there is any sort of locality, or if there are a lot of large sequential reads, this might not yield the desired performance, but with random access of the sort typical of file systems on multi-user systems, this turns out to work very well. The goal of striping is twice the heads and more throughput—coarse grained parallelism.

Mirroring (RAID 1)

The architecture allows multiple mirrored drives, however Polaris and Milkyway have a two- and four-way mirroring restriction. The architecture replicates writes and fails virtual command if any physical command fails (as that would leave the drives inconsistent). The architecture also handles failure exceptions, and alternates reads to share load/wear. The architecture uses the starting LBA (middle word bits) as selector, and doesn't switch once it has started reading a drive. The architecture also tracks drive serial numbers to determine if a drive gets swapped out (in which case the mirror set would be inconsistent).

In some embodiments, all writes go to all members of the mirror set. Reads come from only one drive in the set, but a sector is generally read from the same drive. The architecture uses a simple deterministic scheme for choosing which drive in the set to read from. Chunks are placed on large boundaries in order to ensure good sequential read performance (>100 MB), and allow seek overlapping for improved performance on random reads.

Whenever a mirror set is determined to be inconsistent, a rebuild operation has to take place. The rebuild is marked in non-volatile memory so that the architecture will keep trying rebuilds until the mirrors are in sync. While trying to sync disks, the architecture tracks where the "pointer" is—i.e., where the dividing line is between copied and uncopied drive areas. Writes to blocks behind the pointer (i.e., to the area that is in sync) are replicated, while writes ahead of the pointer can be done to just the synchronized drives.

In some embodiments the architecture keeps the pointer in non-volatile memory so that if power goes off the rebuild can pick up where is left off when the power is restored. When it is too costly to write to non-volatile memory every time the pointer is incremented (i.e., a block is written), the architecture only updates non-volatile memory at regular checkpoints, which reduces the amount of repeat work performed on restart.

The SteelVine implementations use a fair-share style of scheduler to implement the rebuild function. This allows the rebuild activity to consume all of the available resources, other than those used by the host, and provide a lower-bound for the amount of resources used by rebuild when the host wishes to consume all of the resources. This means that if the host is imposing no load, the rebuild activity will get all of the resources and the rebuild will complete in the shortest amount of time. If the host imposes a one hundred percent load, then the rebuild activity will get a guaranteed minimum amount of resources (e.g., 20 percent) so that the rebuild will complete in a bounded period of time. This means that the host gets all the cycles it wants up to the point when it tries to squeeze the rebuild activity to less than the minimum amount and then it pegs at this level.

Mapping Layer

The next layer in the SteelVine Architecture is known as the Mapping Layer. It provides a simple level of indirection between the Target ID field within a Host FIS and the Virtual Drives defined by the preceding layers. This mapping provides the operation of the LUT-based implementation, where the selection of which "page" in the mapping table is performed based on the value within the incoming FIS Target ID field.

Where this function becomes slightly more interesting is when Physical Drives are "identity-mapped" to Virtual Drives. This means that the Virtualization Layer defines a Virtual Drive to be a region consisting of a complete Physical Drive, and there are no enhancements done on this Virtual Drive. In this mode of operation, the SteelVine SSoC acts much like a Port Multiplier and simply passes all commands to a given Target ID (i.e., Virtual Drive) directly to the desired Physical Drive. However, the Mapping Layer allows the remapping of Physical Drive Ports—i.e., Target ID 0 does not have to map to Physical Drive Port 0, but can be mapped to any of the Physical Drive Ports. This feature provides increased flexibility over what is provided by a simple Port Multiplier, and can be useful for reassigning Physical Ports (e.g., for reasons of layout or packaging convenience).

In addition to this, the Mapping Layer allows for the creation of multiple "views*—i.e., a given Physical Drive can be accessed in a variety of different ways, depending on which Target ID is used. For example, four drives in a Brick could be concatenated and presented to the host as Virtual Drive number 0. At the same time, the SteelVine SSoC could be configured so as to permit the same for drives to be accessed as individual (identity-mapped) drives using Target ID numbers one through four. This can be useful to allow administrative access to the individual constituent drives of a Virtual Drive—e.g., to support repair or monitoring activities.

Translation Layer

While the SteelVine Architecture is based upon the SATA storage link protocol, there exist a number of other, abstract, higher-layer, storage protocols (e.g., SCSI, iSCSI, CIFS, NFS, etc.). The top layer in the SteelVine Architecture is known as the Translation Layer and it is the point at which the host access protocol can be translated from the native SATA protocol into virtually any desired host interface protocol. Furthermore, this is where the basic block-oriented service provided by the SteelVine Architecture can be converted into file-level service.

Standard SATA Features

The SteelVine Architecture SSoCs have been defined to be compliant with the various SATA specifications. However, considerable liberties have been taken in the manner in which the features of the specifications are used (while still remaining within the bounds set by the specifications). For example, the ATA specification provides a modestly flexible mechanism for declaring and enabling the functions and features offered by a device, and SteelVine components take advantage of this aspect of the specification. The ATA specification defines a data structure (i.e., IDENT) and protocol (using the Identify Command) that allow a device to declare which (pre-defined) features it supports. Furthermore, SATA allows for the host to select (or enable) specific features among those offered by a device (e.g., DMA mode, number of blocks to transfer in a multi-block operation, etc.). A SteelVine component synthesizes the appropriate IDENT data structures for each of the Virtual Drives that it offers, and indicates the specific features that the component supports.

SATA was defined to be backward-compatible with software written for PATA drives (including device drivers, OS, and applications code). The main interface between host software and the PATA and SATA hardware is a set of registers known as the Taskfile. The ATA Register Set (or Taskfile) originally consisted of eight single-byte registers that were defined as the: Data, Error/Feature, Sector Count, Sector Number, Cylinder Low, Cylinder High, Device Head, and Status/Command Registers.

Originally, drives were addressed by their physical attributes—i.e., Cylinder, Head, and Sector. However, as time went on this form of addressing (known as C/H/S) was replaced by an extended, and simplified, linear form of addressing known as Logical Block Addresses (LBAs). To maintain backward compatibility, the original register set definitions were used for this new form of addressing (i.e., the Sector Number register was used for LBA[7:0], Cylinder Low for LBA[15:8], Cylinder High for LBA[23:16], and part of the Device Head Register for LBA[27:24]). This provided for a 28-bit Block Addressing scheme, which (when using the typical 512 Byte Block size) results in a maximum addressable range of 128 GB—a size soon outstripped by available drive sizes. In response to this, the ATA standard created "extended registers." Two bytes can be written to each of the LBA and Sector Count registers in sequence, thereby extending them to 16 bit values in a way that is backward compatible with legacy software that only deals with 8 bit registers. This extension allows for a 48-bit LBA space that results in a maximum addressable drives size of 128 PB—a size that should last for at least a few years, barring any sort of breakthrough in fundamental storage technology.

ATA transactions between the HBA and device include commands that do not involve the transfer of data (i.e., Non-Data Commands), and data transfer commands. For commands that involve data movement, the ATA Specification defines a number of different data transfer modes, each offering successively higher levels of performance. The two major data transfer modes are known as Programmed I/O (PIO) and Direct Memory Access (DMA). The ATA Register Set also includes a pair of registers in what is known as the Control Block (in addition to the previously described eight registers which are together called the Command Block). The Control Block registers include an Alternate Status/Device Control Register and a Drive Address Register.

SATA Specifications

The SATA I specification defines the first generation of SATA, including all of the basic features of the 1.5 Gbps SATA PHY, Link, Transport and Protocol. The SATA II Specification provides enhancements to the SATA I specification that provide additional features and capabilities at all layers of the specification. At the PHY Layer, this new spec provides guidelines for backplane interconnection and asynchronous signal recovery, as well as the information necessary to define the higher-speed (i.e., 3 Gbps) link speed and the auto-negotiation process that allows host and device to arrive at the highest common link speed setting.

At the Protocol Layer, changes have been made to the Device Command Protocol in support of the new command queuing feature. Native Command Queuing (NCQ) is the name of the new protocol that allows for multiple outstanding commands to be issued on a given device, and allows these commands to return in an order other than that in which they were issued. NCQ support improves system performance by aggregating interrupts instead of having an interrupt per command, which gets to be expensive when there are lots of commands going on. Also, multiple contexts in the host controller allow race-free status returns whenever the drive wants to, which also improves performance.

Another addition to the SATA II specification provides a feature known as the Port Multiplier (PM) capability. This feature allows a single SATA Host Port to be connected to up to 15 drives. This specification permits the creation of a simple, single-level, hub-like device that fans-out a single Host Port to multiple Drive Ports, in a way that is transparent to both the host and the drives. Cascading of PM devices is explicitly prohibited by the specification.

The PM specification makes use, of four unused bits in the FIS header to provide the addressing for the destination drive ports. These bits form a field known as the Target Port field, which is used by the multiplexing device to select the desired destination (Drive) port to use. In normal operation, the HBA adds an address to each FIS header that it sends to the PM. Upon receiving a FIS from the host, the PM device examines the address field in the FIS header, clears the Target Port field, and sends the FIS to the selected destination port. Similarly, FISs coming from a Drive Port are modified to include their incoming port address in the FIS's header, the FIS's CRC is updated to reflect the changes in the header, and the FIS is forwarded off to the Host Port. If an incoming FIS fails its CRC check, a PM device must propagate a bad CRC, and not mask it by writing a good (regenerated) CRC into the FIS.

Polaris-Based Storage Subsystems

Polaris, the first of the SteelVine family of SSoCs to be implemented, provides a subset of the architecture's defined functionality. Milkyway is the first full realization of the complete SteelVine Architecture. Polaris is fixed as a single-host, five-drive, standalone product, whereas Milkyway allows the construction of subsystems with multiple Host Ports and a large number of Drive Ports. A wide range of interesting storage subsystems can be constructed with Polaris-based hardware. The following sections examine both the hardware and software that goes into building storage array controllers using the (Enhanced) Port Multiplier functionality of Polaris and its associated microcode.

The Polaris SSoC's primary external interfaces consist of one SATA II Host Port and five SATA II Drive Ports. In addition, the Polaris SSoC has a variety of minor I/O interfaces including: LED drivers, I²C buses, and several GPIO lines. These external interfaces are both necessary and sufficient to support the basic, five-drive-to-one-host, SATA multiplexer function, as well as all of the "enhanced" functionality defined for Polaris.

Internally, the hardware consists of an embedded processor, a data-movement engine, resources for each of the SATA ports (i.e., PHY, Link and Transport logic, and a set of registers that act as FIFO buffers for the link), and logic for various support functions. Each of the per-port FIFO buffers is connected at one end to the link, and at the other end to a common internal bus. The data-movement functional unit can be directed to move data between defined sets of FIFO buffers. It allows drive-to-host and host-to-drive transfers plus drive-to-drive transfers to take place.

The internal resources (such as the per-port logic, the FIFOs, the data-mover, and the other VO interface logic) are accessed by the embedded processor with loads and stores done through its special control register address space (consisting of the 16 banks of 16 registers defined within the System Control Processor (SCP) Register space). Some of these registers (e.g., the ones that control the SATA PHYs, EEPROM writes, soft reset, etc.) are protected against accidental access.

The Polaris SSoC utilizes an external I²C-attached EEPROM to contain the microcode, configuration state, and policy-related state. The microcode is automatically read into the Pico Instruction Memory on power up, and the code is validated with a simple hardware checksum mechanism.

The Polaris hardware has a soft reset register that resets the Pico processor, but does not force a microcode reload. When a COM-RESET out-of-band signal occurs on the Host Port, a Non-Maskable Interrupt (NMI) is generated, which causes a hard reset (which does force a microcode reload). Microcode load and verification is designed to complete in less than one second of real-time.

System Control Processor (SCP)

In the design of Polaris, an attempt was made to implement the data-plane portions of the design in hardware, and to perform only higher-level, control-plane functions by way of microcode executing on the System Control Processor (SCP)—known as Pico. For each link, the complete SATA physical, link, and transport layers are implemented in hardware. Most of the minor interface functions (e.g., I²C, EEPROM, and LED) have some degree of hardware support, and much of the bulk data movement is performed by dedicated hardware functional units. The Pico's microcode is responsible for implementing most all of the functionality provided by the SSoC—including: initialization, virtualization, mirroring, striping, the movement of FISs between the ports, the handling of exception conditions, enclosure management functions, etc.

As it implements the bulk of the SSoC's functionality, the performance of the Pico processor affects the overall performance of a Polaris-based system. Pico is a simple, embedded, 32-bit control processor, with a dual-issue, RISC-like instruction set, with 32 registers, a seven-stage pipeline, and Harvard memory architecture. Pico I supports counter-timers and external interrupts, but does not provide hardware support for multiply or divide operations. The Pico I processor used in Polaris has no floating point support, no MMU, no cache, and does not do out-of-order execution. It operates at 150 MHz, has 64 KB of SRAM for Instruction Memory, and 16 KB of SRAM for Data Memory.

In addition to the hardware resources described below, there exists an additional bank of registers that provide basic support for the SCP. These are collectively known as the CPU Registers, and include the Processor Status (PS), Interrupt Mask, Interrupt Pending, Exception Program Counter, and Counter/Timer registers.

A complete tool chain based on the Gnu Compiler Suite has been developed for Pico. The Pico tool chain includes a compiler (gcc), assembler (gas), debugger (gdb), as well as the Gnu binary utilities (bintools).

Split-Merge Engine (SME)

The internal data-mover function (known as the Split-Merge Engine (SME)) is essentially an intelligent, on-chip DMA controller that moves double words between locations within the SCP Register address space (i.e., between registers, FIFOs, and memories). The SME is responsible for all of the data movement activities between SATA ports, and is also capable of performing complex scatter-gather operations in support of drive virtualization functions, including both striping and mirroring.

The SME also supports Drive-to-Drive copying. This provides system-level performance when doing operations such as mirror-set rebuild operations, backups, etc. This feature not only reduces the load on the Polaris Host Link, but also reduces the impact of these bandwidth-intensive data copying operations on the host. This means that these copy operations do not impose a burden on the host in terms of a significant number of processing cycles, memory and I/O bandwidth, and do not consume the Polaris Host Link.

Host SATA Port

The Host Port implements the target end of the SATA connection between the host and Polaris. The resources associated with the Host Port include the logic necessary to implement the PHY, Link, and Transport layers of the SATA protocol, a set of control and status registers used to control the connection, and a set of registers that act as a buffer for incoming or outgoing FIS Headers.

The Host Port's logic handles all of the necessary power-up and low-level synchronization activities, as well as the link-level handshaking and exchange of SATA Link Primitives. Some aspects of the SATA protocol processing are handled automatically (e.g., generation of ALIGN, CONT, SOF/EOF, X-RDY, HOLD, R_IP, WTRM, etc. primitives). However, it is up to the Polaris microcode to handle interrupts generated by the reception of certain primitives on the link, and to generate other link primitives (e.g., R-OK, R-ERR, P-SYNC, etc.). This is done through the manipulation of the Host Port's control and status registers. The Host Port logic checks the CRC on incoming FISs and indicates the results of the check in the control and status registers. Similarly, the logic generates CRCs for outgoing FISs. Special accommodations have been made to allow the generation of intentionally bad CRCs on outgoing FISs. The part logic does some low-level demultiplexing of the incoming FISs by way of the FIS target ID field. The port logic identifies FISs destined to address 15 (i.e., PM15), as well as FISs that are addressed to the SEMB logic (i.e., PM N+1—where N is defined by setting a value in the Host Port control and status registers), and generates an appropriate interrupt for each case. Interrupts are generated when other events occur on the Host Port, and all interrupts can be cleared by writes to the proper port control register.

The header of an incoming FIS is automatically deposited into the buffer registers, while the body (or payload) of a FIS is transferred directly to the Target Device, by way of the SME. The act of writing the header of an outgoing FIS into buffer registers triggers the port to send a FIS back to the host. Just as with the port's control and status registers, the buffer registers exist in the SCP Register address space and are read and written as double word (i.e., 32-bit) values.

Drive SATA Ports

The five Drive Ports on Polaris serve as the initiator end of the SATA connections between Polaris and its drives. All of the Drive Ports are largely identical to one another and are also largely the same in function and implementation to the Host Port. The Drive Ports differ from Host Ports by the inclusion of a few additional fields within their control and status registers—e.g., bits to enable bypass and cut-through operation on a port, bits to manipulate the X bit in the port's SStatus Shadow Register, as well as fields associated with the FIOF connected to each Drive Port.

In addition to having a superset of the Host Port's control and status register fields, each Drive Port has a full FIS worth (i.e., 8 KB) of SRAM which is managed as a FIFO. This SRAM is used to buffer FISs moving to and from each of the ports' drives. The Drive Ports' FIFOs can serve as either source or destination for FIS transfers under control of the SME. This design expects that FISs will by transferred into and out of Drive Port FIFOs by the SME engine, but also allows the SCP to read and write (on DWORD boundaries) the FIFOs directly.

Special hardware features are included within Polaris to support the implementation of "cut-through" routing of FISs—to allow the transfer of a FIS to its destination port before all of the bytes have been received. Support for this feature helps to achieve peak performance levels, as otherwise there would be considerable latency added to each transaction as the device performs a "store-and-forward"-type operation (which introduces a considerable latency penalty, but can have negligible impact on the device's throughput-oriented performance). Special features within the Host- and Drive-Ports' logic allow for this feature to be enabled through the manipulation of the respective ports' control registers.

Also, control registers exist within both the Host- and Drive-Ports that allow the configuration of the physical level SATA interface logic.

Enclosure Management Support Functions

The Polaris SSoC supports the standard SATA mechanism for interfacing with a standard Storage Enclosure Processor (SEP). As described earlier, the SATA Storage Enclosure Management Bridge (SEMB) feature allows the Polaris component to act as a Bridge between the HBA and an SEP, via either the SAF-TE or SES protocols.

SEPs can span a wide range in cost, size, and complexity, but in general, SEPs tend to cost more and are larger than a Polaris component, and involve considerably more host software than a SteelVine SSoC. To enable the basic features necessary for simple enclosure management services, at a level of cost and complexity that is more in keeping with that of the SteelVine components, Polaris can support the use of simpler, lower-cost environmental monitoring chips (e.g., the National Semiconductor LM87). Support for low-cost EM components is implemented in microcode, and is provided by SIMG-proprietary extensions to the standard SEMB protocol.

LM87 has a bunch of 8-bit wide registers that can be read/written to provide status and set values. LM87 transactions are real simple—read packet (i2c addr, reg addr) get data byte in response, write packet (i2c addr, reg addr, data byte).

While the basic function of the SEMB can be served by simple $I^2C$ bus interface, Polaris provides dedicated hardware support for the SEMB functions. In addition to a master/slave capable IC bus, there is a dedicated block of (1 KB) of memory and logic that functions like a DMA unit and can be used to transfer blocks of data between the SEMB Memory and devices on the EM IC bus. The EM $I^2C$ bus can be programmed with two different $I^2C$ target addresses.

Because the SEMB $I^2C$ transactions are well defined and highly stylized, the Polaris SEMB Logic provides hardware support for these transactions. In particular, the SEMB Logic automatically receives (six or seven Byte) SEMB packet headers, and generates an interrupt to the Polaris microcode, which handles the disposition of the incoming packet.

The SEMB Logic can be set to automatically add a checksum at the end of each packet, and to generate a checksum for incoming packets (to be verified by the microcode against the value received at the end of each packet)

The SEMB Logic moves data between the SEMB Memory and the EM $I^2C$ bus, and the SME is used to move data between the Host and SEMB Memory (in the same manner as is done when moving Data FISs between the FIFOs and Host).

SEMB Logic can partially parse and decompose incoming SEP packet headers (extracting the sepStat field, CRCs, etc.). can have header-only packets (i.e., no data), or header and data packets.

Can set the Tx data rate on the EM $I^2C$ to one of N choices. There is a separate reset signal for SEMB Logic can be set by microcode. Microcode sends probe packet on reset to see if there is an SEMB on the EM $I^2C$ and notes this so that it can respond appropriately when asked by the Host to return a signature for the PM N+1 port.

The SEMB Memory can be read/written in Double Word accesses by the SCP. SEMB Logic includes a timer to allow timeout interrupts so that hung EM 12C transactions can be detected.

LED Control Logic

Another feature of SteelVine components is the ability to determine physical drive state by way of LEDs. Different storage applications require different types of external indications, therefore the SteelVine components must support different LED behaviors. For example, enterprise products demand no LED indications be given other than those indicating failures, while consumer products require both drive activity and power indications.

Polaris has hardware support for blinking LED indications, as well as allowing the automatic display of drive activity. It is important to provide hardware support for both of these functions as the overhead of performing them in microcode would be prohibitive. Polaris has two LEDs per Drive Port, two for the Host Port, and four System LEDs. The per-port LED pairs can operate in one of eight different modes that represent different conditions by the states of the LEDs. Each LED can be set on, off, or made to blink. They behave differently depending on whether they are in enterprise mode or not. One of the pair of per-port LEDs can be programmed to toggle (either on or off, for tens of msecs) in response to activity. The auto-blink mode causes selected LEDs to toggle state at about a 1 sec cycle time.

The System LEDs are controlled directly by microcode and do not have any hardware support (beyond turning them on/off).

In Polaris, support is also provided for access to an external EEPROM that is used to store all of the execution microcode, virtualization state, and other configuration information for the device.

Polaris Software Overview

As illustrated in FIG. 12, the software component of Polaris-based storage subsystems consists of three different types, of software. The three parts exist in three different locations: on the SSoC, on a board local to the SSoC, and on the host. Different storage products based on the Polaris SSoC differ only in the specifics of the type and amount of software required to deliver the desired functionality. The differing amounts of resources available to each of these different types of software demands that they be implemented somewhat differently. The same best practices in software engineering are to be applied to the development of this software, independent of the type of software in question.

Each of these three different categories of software for Polaris-based storage subsystems is. described (at a high-level) in the following subsections, starting from host software, moving to the software on the local controller, and finishing with the software on the Polaris SSoC proper. In addition to this, the various key interfaces between software within the storage subsystem are also described. This includes an interface for defining and implementing policy modules, for monitoring the subsystem's operation, and for updating the microcode within the Polaris SSoC.

Host Software

The software that runs on the Host side consists of system- and application-level software that runs in a standard, resource-rich host environment, with few constraints. It is desirable to minimize the amount of system-level software that is required for a given Polaris-based storage product. This is because of the high costs associated with the continual porting and compatibility testing of the drivers for each new OS and platform release. Some system software may be delivered in the form of daemons that run without user interaction, such as policy or adaptors that map the features of the storage subsystem into an existing system management console.

Device Drivers

At the lowest level, there is functionality implemented within a device driver. This can include a variety of low-level features, such as generating call-backs (to ioctls) as a result of the occurrence of asynchronous notifications of events of interest form the storage subsystem, and allowing (ioctl-like) access to low-level features of the Polaris hardware. One of the goals of the SteelVine Architecture is to allow the addition of functionality, transparent to the Host. This means that it must be possible to build storage subsystems with Polaris hardware that operate properly with existing (legacy) device drivers. Certain features of a given subsystem may only be accessible through a special device driver, but it is desirable to derive much of the value of the subsystem, by way of standard, released device drivers.

Applications

At the top layer are user-interaction applications, such as CLI and GUI that interact with the user. A CLI may enable scripting or other management functions. A GUI may simplify operations through abstraction.

External Interface API/Library

The architecture may provide an external interface library for accessing features of the system. This way, the details of how the communications with the subsystem are abstracted away and changes can be made independently to the different components of the subsystem. All Host SW (other than Device Drivers) may use a common library to ensure uniform access to features and to increase portability.

External Controller Firmware

Several different kinds of embedded controller are found in a Polaris-based storage subsystem, including processors for enclosure management, external interface handling, and implementing external policies. While functions can handled by individual processors, or aggregated together on a common processor, the type of software that executes on these processors is similar in nature, and is referred to herein as Firmware. The Firmware has characteristics in common with both Host software and Microcode. However, the Firmware execution environment typically has fewer resources associated with it than the typical Host environment, but considerably more than what is available to the Polaris microcode. The Run-Time Environment can be the same as that used for microcode or a commercial RTOS, or even a Unix derivative (knoppix, eCos, etc.). Interface Packages are firmware modules to provide desired external interfaces (e.g., web server, protocols, link interfaces, etc.), HTTP, TCP/IP, USB, etc., depending on what kind of external interface is to be provided to the storage subsystem. For example. Polaris can offer a serial or USB port to run CLI for configuration, monitoring, or updates or can also run web server and hook up Ethernet to allow control/monitoring from a web browser.

SSoC Microcode

The code that executes on the Polaris SSoC is known generally as microcode, and consists of several key parts, including a common services portion, an application-specific part, and (optionally) embedded policy modules. As different feature sets are defined for different products, the changes to the microcode should be confined to the policy modules.

There are a wide range of different usage models, ranging from no-touch appliance, to high-touch management system. Depending on the mode in which the part is used, it could require anywhere from no additional software to extensive amounts of software.

CONCLUSION

From the foregoing, it will be appreciated that specific embodiments of the advanced storage system have been described herein for purposes of illustration, but that various modifications may be made without deviating from the spirit and scope of the invention. For example, although storage devices have generally been referred to above in terms of disk drives, a variety of different storage devices could be used that are not based on disks, such as flash devices, tape drives, and other storage technologies. Similarly, although the storage interfaces have been described in terms of SATA interfaces, other storage interfaces could also be used with the advanced storage system such as Parallel Advanced Technology Attachment (PATA), Universal Serial Bus (USB), Firewire, and Fibre Channel. The advanced storage system may also be implemented in either hardware or software such as on a custom ASIC or by using a generic computer system. Accordingly, the invention is not limited except as by the appended claims.

We claim:

1. A system comprising:
a switch storage system intermediary coupled between a host computer system and physical storage mediums such that the host computer system is configured to recognize the physical storage mediums as one or more virtual storage mediums, each virtual storage medium including a set of the physical storage mediums and each virtual storage medium configured to implement commands of storage hardware; and
the physical storage mediums configured to recognize the switch storage system as a host controller irrelevant of a topology of the physical storage mediums;
wherein the switch storage system is configured to:
receive virtual commands from the host computer system and to map the virtual commands to physical commands, and communicate the physical commands to the physical storage mediums;

receive replies from the physical storage mediums in response to execution of the physical commands and communicate the replies as a single virtual reply to the computer system;

separate the acknowledgement cycle between the host computer system and the switch storage system and the acknowledgement cycle between the switch storage system and the connected devices, and hide retrying of physical commands that fail from the host computer system by responding to the request indicating success after the physical command fails, and then, after responding to the request indicating success, retrying the physical command.

2. The system of claim 1, wherein when retrying the physical command fails, the switch storage system reports that the overall storage operation failed.

3. The system of claim 1, wherein the switch storage system accepts more than one outstanding virtual command from the host computer system even if the physical storage mediums cannot.

4. The system of claim 3, wherein the switch storage system provides a fixed number of outstanding virtual commands dynamically allocated to a variable number of outstanding commands per virtual storage medium.

5. The system of claim 1, wherein the switch storage system maps the same physical storage mediums to a plurality of the virtual storage mediums.

6. The system of claim 1, wherein the switch storage system synthesizes an appropriate identification structure for each of the virtual storage mediums.

7. A system comprising:
a switch storage system intermediary coupled between a computer system and one or more physical storage mediums such that the host computer system is configured to recognize the one or more physical storage mediums as a single virtual storage medium that implements commands of storage hardware;

the one or more physical storage mediums configured to recognize the switch storage system as a host controller irrelevant of a topology of the one or more physical storage mediums; and wherein the switch storage system is configured to:
receive a virtual command from the host computer system;
map the virtual command to one or more physical commands, wherein a first physical command of the one or more physical commands is addressed to a first of the one or more physical storage mediums;
communicate the first physical command to the first physical storage medium;
receive one or more physical replies from the one or more physical storage mediums in response to execution of the one or more physical commands, wherein the one or more physical replies from the first physical storage medium include a first physical reply
communicate the one or more physical replies as a single virtual reply to the computer system;
hide retrying of physical commands that fail from the host computer system by responding to the request indicating success, after the physical command fails, and then, after responding to the request indicating success, retrying the physical command
incorporate a second physical storage medium into the one or more physical storage mediums, wherein the switch storage system automatically reconfigures itself to change the map of virtual commands to one or more physical commands such that the computer system recognizes the one or more physical storage mediums as a single virtual storage medium that implements commands of storage hardware.

8. The system of claim 7, wherein the switch storage system records the serial number of the one or more physical storage mediums.

9. The system of claim 8, wherein whereupon the second physical storage medium is recognized, but repositioned to a different physical interface, the map of virtual command to one or more physical commands is automatically updated to account for said repositioning.

10. The system of claim 7, wherein the switch storage system wherein upon incorporating the second physical storage medium, the switch storage system prevents access to the second physical storage medium until additional user action is taken.

11. The system of claim 7, wherein the switch storage system automatically reconfiguring itself follows instructions based on providing specific features during manufacturing.

12. The system of claim 7, wherein the switch storage system aggregates one or more data channels connecting a plurality of the one or more physical storage mediums to the switch storage system into one faster virtual channel.

13. The system of claim 7, wherein the second physical storage medium is incorporated into a mirror set of a plurality of physical storage mediums.

14. The system of claim 13, wherein the mirror set is rebuilt when determined to be inconsistent, progress of rebuilding described by a pointer.

15. The system of claim 14, wherein writes behind the pointer are replicated.

16. The system of claim 14, wherein writes ahead of the pointer are done to only the synchronized physical storage mediums of the plurality of physical storage mediums.

17. The system of claim 14, wherein the pointer is kept in non-volatile memory.

18. An apparatus comprising:
a switch storage system intermediary coupled between a host computer system and physical storage mediums such that the computer system is configured to recognize the physical storage mediums as one or more virtual storage mediums, each virtual storage medium including a set of the physical storage mediums and each virtual storage medium configured to implement commands of storage hardware; and the physical storage mediums configured to recognize the switch storage system as a host controller irrelevant of a topology of the physical storage mediums;

wherein the switch storage system is configured to:
receive virtual commands from the host computer system,
map the virtual commands to physical commands;
communicate the physical commands to the physical storage mediums;
receive replies from the physical storage mediums in response to execution of the physical commands and communicate the replies as a single virtual reply to the computer system;
separate the acknowledgement cycle between the host and the switch storage system and the acknowledgement cycle between the switch storage system and the connected devices; and
hide retrying of physical commands that fail from the host computer system by responding to the request indicating success, after the physical command fails, and then, after responding to the request indicating success, retrying the physical command.

19. A method comprising:

establishing communication, via a switch storage system, between a host computer system and physical storage mediums such that the host computer system recognizes the physical storage mediums as one or more virtual storage mediums, each virtual storage medium containing a set of the physical storage mediums and each virtual storage medium configured to implement commands of storage hardware, wherein establishing communication includes:
- recognizing, via the physical storage mediums, the switch storage system as a host controller irrelevant of a topology of the physical storage mediums;
- receiving, via the switch storage system, virtual commands from the host computer system;
- mapping the virtual commands to physical commands;
- communicating the physical commands to the physical storage mediums
- receiving replies from the physical storage mediums in response to execution of the physical commands and communicate the replies as a single virtual reply to the computer system;
- separating the acknowledgement cycle between the host and the switch storage system and the acknowledgement cycle between the switch storage system and the connected devices; and
- hiding retrying of physical commands that fail from the host computer system by responding to the request indicating success, after the physical command fails, and then, after responding to the request indicating success, retrying the physical command.

\* \* \* \* \*